United States Patent
Mishiro et al.

(10) Patent No.: US 8,920,691 B2
(45) Date of Patent: Dec. 30, 2014

(54) METHOD FOR PRODUCING CARBONIZED FILM AND METHOD FOR PRODUCING GRAPHITE FILM

(75) Inventors: Makoto Mishiro, Settsu (JP); Yasushi Nishikawa, Takatsuki (JP); Yusuke Ohta, Settsu (JP); Takashi Inada, Kawasaki (JP)

(73) Assignee: Kaneka Corporation, Osaka (JP)

( * ) Notice: Subject to any disclaimer, the term of this patent is extended or adjusted under 35 U.S.C. 154(b) by 23 days.

(21) Appl. No.: 13/583,572

(22) PCT Filed: Mar. 9, 2011

(86) PCT No.: PCT/JP2011/001372
§ 371 (c)(1),
(2), (4) Date: Nov. 19, 2012

(87) PCT Pub. No.: WO2011/111380
PCT Pub. Date: Sep. 15, 2011

(65) Prior Publication Data
US 2013/0240128 A1    Sep. 19, 2013

(30) Foreign Application Priority Data

Mar. 10, 2010 (JP) ................................. 2010-053518
Mar. 10, 2010 (JP) ................................. 2010-053519

(51) Int. Cl.
*B32B 38/00* (2006.01)
*C01B 31/04* (2006.01)

(52) U.S. Cl.
CPC ............. *B32B 38/0036* (2013.01); *C01B 31/04* (2013.01)
USPC .......................... 264/29.1; 264/29.7; 264/29.6

(58) Field of Classification Search
CPC .... B32B 38/004; B32B 38/0036; C01B 31/04
USPC ....................................... 264/29.6, 29.1, 29.7
See application file for complete search history.

(56) References Cited

U.S. PATENT DOCUMENTS 5,443,859 A * 8/1995 Nagata .......................... 427/122

FOREIGN PATENT DOCUMENTS

JP         63-256508         10/1988
JP         5-132360          5/1993
(Continued)

OTHER PUBLICATIONS

International Search Report, International Application No. PCT/JP2011/001372, mailed Apr. 26, 2011.
(Continued)

*Primary Examiner* — Yogendra Gupta
*Assistant Examiner* — Kimberly A Stewart
(74) *Attorney, Agent, or Firm* — Kagan Binder, PLLC

(57) ABSTRACT

Disclosed herein is a production method capable of efficiently producing a carbonized film wound into a roll without the occurrence of fusion bonding between the layers of the film. The method includes a carbonization step in which a polymer film wound around a core is placed in a heating furnace and carbonized by heat treatment to obtain a carbonized film wound around the core. The carbonization step is performed by increasing a temperature of the heat treatment from an initial temperature through a pyrolysis onset temperature to a pyrolysis end temperature. In the carbonization step, the heating furnace is decompressed when the temperature of the heat treatment is lower than the pyrolysis onset temperature, and after the temperature of the heat treatment reaches the pyrolysis onset temperature, the heating furnace is not decompressed or the heating furnace is decompressed so that an absolute pressure in the heating furnace is in a range of 21.3 kPa to 101.29 kPa.

35 Claims, 4 Drawing Sheets

(56) References Cited

FOREIGN PATENT DOCUMENTS

| | | | | |
|---|---|---|---|---|
| JP | 7-109171 | 4/1995 | | |
| JP | 2000-178016 | 6/2000 | | |
| JP | 2006-44999 | 2/2006 | | |
| JP | 2006-044999 | * 2/2006 | | |
| JP | 2006-327907 | * 12/2006 | ............ | C01B 31/04 |
| JP | 2008-207967 | * 9/2008 | ............ | C01B 31/04 |
| JP | 2010/029761 | 3/2010 | | |
| JP | 2010/150300 | 12/2010 | | |

OTHER PUBLICATIONS

Office Action in counterpart CN Application No. 201180012554.8 with English translation.

* cited by examiner

US 8,920,691 B2

METHOD FOR PRODUCING CARBONIZED FILM AND METHOD FOR PRODUCING GRAPHITE FILM

This application claims benefit from International Application No. PCT/JP2011/001372 which was filed on Mar. 9, 2011, which in turn claims priority to Japanese Application No. 2010-053518 which was filed on Mar. 10, 2010, and Japanese Application No. 2010-053519 which was filed on Mar. 10, 2010, wherein the entireties of said patent applications are incorporated herein by reference.

TECHNICAL FIELD

The present invention relates to a method for producing a carbonized film from a polymer film by utilizing polymer pyrolysis and a method for producing a graphite film by utilizing the method for producing a carbonized film.

BACKGROUND ART

A graphite film is a material particularly excellent in high thermal conductivity, and is therefore widely used in, for example, electronic parts to take advantage of its characteristics.

As methods for producing a commercially-available highly thermal conductive graphite film, an expanding method in which expanded graphite is rolled into a sheet and a polymer pyrolysis method in which pyrolysis (carbonization) of a polymer film and then graphitization are performed are known.

Patent Document 1 discloses a method for producing a graphite film by utilizing a polymer pyrolysis method, in which a polymer film is wound around a cylindrical graphitic carbon core and heated at 1800° C. or higher in an inert gas or a vacuum.

PRIOR ART DOCUMENT

Patent Document

Patent Document 1: JP-A-63-256508

SUMMARY OF THE INVENTION

Problem to be Solved by the Invention

It has been found that the method disclosed in Patent Document 1 has a problem in that when the number of turns of a polymer film is increased to improve productivity, fusion bonding occurs between the layers of the wound film in the process of carbonization of the polymer film.

In view of the circumstances, it is an object of the present invention to provide a production method capable of efficiently producing a carbonized film wound into a roll without the occurrence of fusion bonding between the layers of the film.

Means for Solving the Problem

The present inventors have intensively studied and have considered that fusion bonding between the layers of the film is caused by the following reason. A decomposition gas generated from a polymer film in the process of carbonization is not sufficiently discharged from between the layers of the film, and as a result the decomposition gas retained between the layers of the film is changed into tar after cooling, and the tar adheres to a carbonized film and plays a role in bonding the layers of the carbonized film together. Based on this, the present inventors have studied conditions under which a carbonization step is performed so that a decomposition gas generated from a polymer film in the process of carbonization can be sufficiently discharged from between the layers of the film. As a result, the present inventors have unexpectedly found that the occurrence of fusion bonding between the layers of the film can be inhibited by reducing the pressure in a heating system before the start of polymer pyrolysis.

That is, the present invention relates to a method for producing a carbonized film including: a preparation step in which a polymer film wound around a core is prepared; and a carbonization step in which the polymer film is placed in a heating furnace and carbonized by heat treatment to obtain a carbonized film wound around the core, wherein the carbonization step is performed by increasing a temperature of the heat treatment from an initial temperature through a pyrolysis onset temperature to a pyrolysis end temperature, and wherein the heating furnace is decompressed when the temperature of the heat treatment is lower than the pyrolysis onset temperature, and wherein the heating furnace is not decompressed after the temperature of the heat treatment reaches the pyrolysis onset temperature.

Further, the present invention relates to a method for producing a carbonized film including: a preparation step in which a polymer film wound around a core is prepared; and a carbonization step in which the polymer film is placed in a heating furnace and carbonized by heat treatment to obtain a carbonized film wound around the core, wherein the carbonization step is performed by increasing a temperature of the heat treatment from an initial temperature through a pyrolysis onset temperature to a pyrolysis end temperature, and wherein the heating furnace is decompressed when the temperature of the heat treatment is lower than the pyrolysis onset temperature, and wherein, after the temperature of the heat treatment reaches the pyrolysis onset temperature, the heating furnace is decompressed so that an absolute pressure in the heating furnace is in a range of 21.3 kPa to 101.29 kPa.

Preferably, an absolute pressure in the heating furnace during the decompression performed at lower than the pyrolysis onset temperature is 70 kPa or less, and more preferably, 10 kPa or less.

Preferably, the decompression at lower than the pyrolysis onset temperature is performed when the temperature of the heat treatment is in a range of 100 to 450° C.

Preferably, a rate of temperature rise during the heat treatment is 5° C./min or less until the temperature of the heat treatment reaches the pyrolysis onset temperature.

Preferably, an inert gas is introduced into the heating furnace after the temperature of the heat treatment reaches the pyrolysis onset temperature.

Preferably, the inert gas is introduced into the heating furnace at a flow rate of 1 L/min or more after the temperature of the heat treatment reaches the pyrolysis onset temperature.

It is also preferred that, during introduction of the inert gas, the second decompression is performed so that the absolute pressure in the heating furnace is in a range of 21.3 kPa to 101.29 kPa.

Preferably, when subjected to the carbonization step, the polymer film wound around the core is housed in an external tube.

Preferably, the external tube has gas permeability.

Preferably, the external tube has a gas vent.

Preferably, when a value obtained by dividing (inner diameter of the external tube−diameter of the core) by 2 is defined as a (mm) and a thickness of a roll of the polymer film is defined as b (mm), a ratio of a/b is 1.8 or more but 3.8 or less.

Preferably, the preparation step is a step in which the polymer film is wound around the core while a tension of 40 N/m or more is applied to the polymer film.

Preferably, the polymer film is wound around the core at a winding speed of 1 m/min or more.

Preferably, when a tension applied to the polymer film at a point 3 m apart from an winding-start end of the film is defined as Ps and a tension applied to the polymer film at a point 3 m apart from a winding-end end of the film is defined as Pe, a tension ratio of Pe/Ps is 1.1 or more.

Preferably, the step in which the polymer film is wound around the core is performed while the polymer film wound around the core is pressed at a pressure of 70 N/m or less by means of a nip roller.

Preferably, the step in which the polymer film is wound around the core is performed without applying a pressure to the polymer film by means of a nip roller.

Preferably, the step in which the polymer film is wound around the core is performed while static electricity of the polymer film is eliminated (i.e., the polymer film is diselectrified). Further the present invention relates to a method for producing a graphite film including the steps of: producing a carbonized film by the above production method; and producing a graphite film by graphitizing the carbonized film.

Effect of the Invention

According to the production method of the present invention, a carbonized film can be produced by thermally carbonizing a long polymer film wound around a core while the occurrence of fusion bonding between the layers of the film is inhibited. It is considered that the reason for this is that gas trapped between the layers of the polymer film is expanded by reducing the pressure in a heating system before the start of pyrolysis of the polymer film so that appropriate gaps are created between the layers of the polymer film. More specifically, it is considered that a decomposition gas generated by the pyrolysis of the polymer film is easily discharged through the gaps created before the start of pyrolysis of the polymer film, which makes it possible to inhibit the occurrence of fusion bonding between the layers of the film.

PREFERRED MODE FOR CARRYING OUT THE INVENTION

Figure 1:
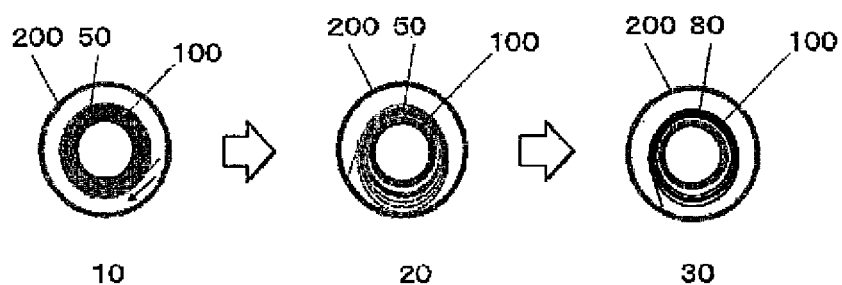
FIG. 1 is a diagram showing the process of loosening and carbonization of a film during temperature rise in a carbonization step.

The present invention provides a method for producing a carbonized film by carbonizing a polymer film wound around a core by heat-treating the polymer film. The present invention also provides a method for producing a graphite film by graphitizing a carbonized film obtained by the carbonized film production method by heat-treating the carbonized film at a higher temperature.

The carbonized film production method according to the present invention includes: (1) a preparation step in which a polymer film wound around a core is prepared; and (2) a carbonization step in which the polymer film is heat-treated after the preparation step to obtain a carbonized film. The graphite film production method according to the present invention further includes (3) a graphitization step in which the carbonized film is heat-treated after the carbonization step to obtain a graphite film.

(Polymer Film)

A polymer film used in the present invention is a band-shaped long film wound around a core. The length of the polymer film is not particularly limited, but is preferably 30 m or more, more preferably 50 m or more, even more preferably 100 m or more. When the polymer film is longer, the number of turns of the polymer film is larger, and therefore loosening of the polymer film is less likely to occur in the central part of a roll of the film (i.e., in the part of a roll of the film near the core) so that fusion bonding between the layers of a carbonized film is more likely to occur. The width of the polymer film is not particularly limited, but is preferably 250 mm or more, more preferably 500 mm or more. When the width of the polymer film is larger, a decomposition gas generated in the central part of the film roll is less likely to be discharged to the outside of the film roll so that fusion bonding between the layers of a carbonized film is more likely to occur. The thickness of the polymer film is not particularly limited, but is preferably 50 μm or more. When the thickness of the polymer film is larger, a larger amount of decomposition gas is generated per unit time so that fusion bonding between the layers of a carbonized film is more likely to occur. The present invention makes it possible to inhibit the occurrence of fusion bonding between the layers of a carbonized film by performing the carbonization step under conditions that will be described later, and therefore the length, width, and thickness of the polymer film can be made larger as compared to a case where a conventional production method is used.

A polymer constituting the polymer film is not particularly limited, but polyimide is particularly preferred because a graphite film having excellent thermal conductivity can be obtained.

(Preparation Step)

The preparation step is a step in which a polymer film wound around a core is prepared. In this step, a polymer film is wound around a core so that the number of turns of the film is 2 or more, and a slip sheet is not interposed between the layers of the film and therefore the layers of the film are in direct contact with each other. The core is, for example, a cylindrical member, and the height thereof is set larger than the width of the polymer film. However, the present invention may be carried out without using a core prepared as a member. That is, the phrase "wound around a core" in the present invention includes both cases where the film is wound around a core prepared as a member and where the film is wound into a roll without using a core prepared as a member and the innermost layer of the roll serves as a core.

The winding of the polymer film around the core is performed in an atmosphere in which gas (usually, air or nitrogen) is present.

The polymer film is preferably wound around the core while a tension of 40 N/m or more, preferably 100 N/m or more is applied to the polymer film. By winding the polymer film around the core while a tension of 40 N/m or more is applied to the polymer film, it is possible to increase a repulsive force tending to unwind the film. This promotes unwinding of the film in the carbonization step that will be described later so that the film is easily loosened by gas expansion. As a result, gaps can be effectively created between the layers of the film in the carbonization step, and therefore a decomposition gas is easily discharged through the gaps to the outside of a roll of the film. This makes it possible to inhibit the occurrence of fusion bonding between the layers of a carbonized film. Further, by winding the polymer film around the core while a tension of 40 N/m or more is applied to the polymer film, it is possible to control the amount of gas trapped between the layers of the film during winding of the film. This makes it possible to prevent excessive loosening of the film caused by entrapment of an excessive amount of gas between the layers of the film. As a result, it is possible to inhibit the occurrence of waving in a carbonized film. It is to be noted that the mechanism of occurrence of waving will be described later in detail. Further, by winding the polymer film around the core while a tension of 100 N/m or more is applied to the polymer film, stress distribution along the radial and tangential directions of a roll of the film can be made uniform. Therefore, loosening of the film uniformly occurs in the entire film roll, and film shrinkage also uniformly occurs in the entire film roll during carbonization. As a result, it is possible to more effectively inhibit the occurrence of waving in a carbonized film.

The tension applied to the polymer film when the polymer film is wound around the core is preferably 400 N/m or less, more preferably 300 N/m or less, even more preferably 200 N/m or less. By winding the polymer film around the core while a tension of 400 N/m or less is applied to the polymer film, it is possible to trap an effective amount of gas between the layers of the film. This makes it possible to loosen the wound film by expansion of the trapped gas to create gaps between the layers of the film. This makes it easy to inhibit the occurrence of fusion bonding after carbonization.

The speed at which the polymer film is wound around the core is preferably 1 m/min or more, more preferably 3 m/min or more, even more preferably 10 m/min or more, particularly preferably 30 m/min or more. By winding the polymer film around the core at such a high speed, it is possible to easily trap gas between the layers of the film and therefore to increase the amount of the trapped gas. This makes it easy to loosen the wound film by expansion of the gas and therefore to inhibit the occurrence of fusion bonding after carbonization.

When the tension applied to the polymer film at a point 3 m apart from the winding-start end of the film is represented by Ps and the tension applied to the polymer film at a point 3 m apart from the winding-end end of the film is represented by Pe, the ratio of the tension Pe to the tension Ps (i.e., Pe/Ps) at the time when the polymer film is wound around the core is preferably 1.1 or more. Loosening of the polymer film wound around the core starts from the outer peripheral part of a roll of the film. Therefore, when the polymer film is wound around the core, a high tension is applied to the polymer film constituting the outer peripheral part of a roll of the film to increase a repulsive force tending to unwind the film so that the film can be more easily loosened. On the other hand, the repulsive force tends to be smaller in the central part than in the outer peripheral part of the film roll due to high resistance from the outer peripheral part of the film roll. Therefore, the tension applied to the polymer film constituting the central part of the film roll during winding of the polymer film is set relatively low so that a larger amount of gas can be trapped between the layers of the film, which makes it possible to more effectively inhibit the occurrence of fusion bonding after carbonization.

During winding of the polymer film around the core, the polymer film wound around the core is preferably pressed by means of a nip roller. In this case, a pressure applied to the nip roller is preferably 70 N/m or less, more preferably 50 N/m or less, even more preferably 20 N/m or less. By winding the polymer film while such a pressure is applied to the polymer film, it is possible to effectively trap gas between the layers of the film, thereby enhancing the effect of inhibiting the occurrence of fusion bonding.

However, the polymer film may be wound around the core without applying a pressure to the polymer film by means of a nip roller. Also in this case, the effect of inhibiting the occurrence of fusion bonding can be obtained.

The polymer film is preferably wound around the core while static electricity of the polymer film is eliminated (i.e., the polymer film is diselectrified). By diselectrifying the polymer film, it is possible to improve the slipperiness of the surface of the film and therefore to more easily loosen the polymer film. As a result, it is possible to enhance the effect of inhibiting the occurrence of fusion bonding.

By diselectrifying the polymer film, the amount of charge in the polymer film wound around the core is preferably reduced to 20 kV or less, more preferably 15 kV or less, even more preferably 8 kV or less, particularly preferably 3 kV or less. The diselectrification may be performed on both surfaces of the polymer film. Alternatively, the diselectrification may be performed on only one of the surfaces of the polymer film, which makes it possible to cause a difference in the amount of charge between the top and back surfaces of the polymer film. This makes it possible to inhibit excessive loosening of the film, thereby effectively inhibiting the occurrence of waving.

It is preferred that the polymer film wound around the core is not restrained when subjected to the next carbonization step. The term "restrain" means an action to inhibit loosening of the film, and examples of such an action include: fixation of the end of the polymer film with an adhesive tape; and putting a weight on the polymer film. When not being restrained, the polymer film can be easily loosened, which is effective in inhibiting the occurrence of fusion bonding after carbonization.

In the present invention, the polymer film wound around the core is preferably housed in an external tube when subjected to the next carbonization step. The external tube may be one in which the entire roll of the polymer film is housed or one in which part of a roll of the polymer film is housed. By subjecting a roll of the polymer film housed in the external tube to the carbonization step, it is possible to inhibit the occurrence of waving caused by excessive loosening of the film or the occurrence of cracking. The external tube more preferably has gas permeability. More specifically, the external tube even more preferably has a gas vent in at least a part thereof. By allowing the external tube to have gas permeability, a decomposition gas generated by polymer pyrolysis can be easily discharged, which makes it possible to more effectively inhibit the occurrence of fusion bonding after carbonization.

The external tube is preferably made of a material that can withstand continuous use at a temperature of 500° C. or higher. Examples of such a material include ceramics such as alumina ($Al_2O_3$), zirconia ($ZrO_2$), quartz ($SiO_2$), silicon carbide (SiC), titania ($TiO_2$), magnesia (MgO), silicon nitride ($Si_3N_4$), aluminum nitride (AlN) yttria ($Y_2O_3$), mullite ($3Al_2O_3.2SiO_2$) cordierite ($2MgO.2Al_2O_3.5SiO_2$), steatite ($MgO.SiO_2$), and forsterite ($2MgO.SiO_2$). When the carbonization step and the graphitization step are continuously performed, it is preferred that the external tube is made of a material that can withstand continuous use at a temperature of 2000° C. or higher, preferably 2800° C. or higher. Examples of such a material include C/C composites obtained by reinforcing graphite with carbon fibers and isotropic graphite such as extruded graphite, molded graphite, and cold isostatic press graphite. It is to be noted that such materials may also be used as materials for forming the core.

The shape of the external tube is not particularly limited. The inner shape of the external tube is determined in consideration of that the inner surface of the external tube is to be brought into contact with the loosened film. Further, the inner shape of the external tube is preferably one that does not restrict loosening of the film. Further, the inner surface of the external tube preferably has less surface irregularities.

More specifically, the inner shape of the external tube may be either cylindrical or rectangular parallelepiped. Further, the inner surface of the external tube does not always need to be continuous. For example, the inner surface of the external tube may be one obtained by providing two or more members (e.g., ring-shaped members) in a direction perpendicular to the axis of the core so that the outer periphery of a roll of the polymer film is surrounded with the members. Alternatively, the inner surface of the external tube may be one obtained by providing two or more rod-shaped members along the outer peripheral surface of a roll of the polymer film in a direction parallel to the axis of the core. The cross-sectional shape of the inside of the external tube (which is a cross-sectional shape in a direction perpendicular to the axis of the core) is preferably close to a circle, more preferably a perfect circle or an ellipse, particularly preferably a perfect circle so that the wound film can be smoothly loosened.

When the external tube is used in the present invention, it is preferred that there is a gap between the inner surface of the external tube and the outer peripheral surface of a roll of the polymer film that has not been loosened yet. The presence of the gap makes it possible to loosen the wound film. More specifically, when the cross-sectional shape of the inside of the external tube and the cross-sectional shape of the core (both of which are cross-sectional shapes in a direction perpendicular to the axis of the core) are circular, the relationship between a value a (mm) obtained by dividing (inner diameter of external tube−diameter of core) by 2 and a value b (mm) that is the thickness of a roll of the polymer film, that is, the ratio of a/b is preferably 1.8 or more but 3.8 or less. When the ratio of a/b is 1.8 or more, the gap allowing loosening of the film can be sufficiently provided, which is effective in inhibiting the occurrence of fusion bonding. On the other hand, when the ratio of a/b is 3.8 or less, it is possible to prevent excessive loosening of the film, which is effective in inhibiting the occurrence of waving or cracking in a carbonized film.

(Carbonization Step)

The carbonization step is a step in which the polymer film is heat-treated in a temperature range (e.g., about 1000° C. or less) in which the pyrolysis (carbonization) of a polymer proceeds but graphitization does not sufficiently proceed. By performing this step, a polymer constituting the polymer film is thermally decomposed so that a decomposition gas (which includes nitrogen, oxygen, hydrogen, carbon, etc.) is discharged and a carbonized film is formed. The weight of the obtained carbonized film is about 60% of that of the polymer film as a raw material, and the carbonized film is a glassy film.

The carbonization step according to the present invention is performed by heat-treating the polymer film wound around the core placed in a heating furnace to obtain a carbonized film wound around the core. In the carbonization step, the polymer film is carbonized by increasing the temperature of heat treatment from an initial temperature through a pyrolysis onset temperature to a pyrolysis end temperature.

Here, the initial temperature refers to a low temperature at which the pyrolysis of a polymer constituting the polymer film does not start. More specifically, the initial temperature is not particularly limited, but may be room temperature.

The pyrolysis onset temperature refers to a temperature at which the pyrolysis of a polymer constituting the polymer film starts and the film starts to discharge a decomposition gas so that the weight of the film starts to substantially decrease. More specifically, the pyrolysis onset temperature refers to a temperature at which the amount of decrease in the weight of the polymer film exceeds 2%. The pyrolysis onset temperature is not particularly limited, but when the polymer film is a polyimide film, the pyrolysis onset temperature is about 550° C.

The pyrolysis end temperature refers to a temperature at which the pyrolysis of a polymer constituting the polymer film is substantially completed and the decrease in the weight of the film substantially stops. More specifically, the pyrolysis end temperature is not particularly limited but is, for example, about 1000° C. to 1400° C.

In the carbonization step according to the present invention, the polymer film wound around the core is exposed to a reduced pressure by reducing the pressure in the heating furnace in the process of temperature rise for carbonization from the initial temperature to the pyrolysis onset temperature. This makes it possible to inhibit the occurrence of fusion bonding between the layers of a carbonized film wound around the core.

It can be considered that the occurrence of fusion bonding that is a problem to be solved by the present invention is caused by the following reason. A decomposition gas generated in the process of carbonization of the polymer film is not sufficiently discharged from between the layers of the film, and as a result, the decomposition gas retained between the layers of the film adheres to a carbonized film after cooling and plays a role in bonding the layers of the carbonized film together.

As described above, in the preparation step, a polymer film is wound around a core in such a manner that gas (usually, air or nitrogen) is trapped between the layers of the film. In the present invention, the film is exposed to a reduced pressure, which can promote the expansion of the gas present between the layers of the film. It can be considered that this makes it possible to create appropriate gaps between the layers of the film. That is, the wound film is loosened to the central part of a roll of the film (i.e., to the part of a roll of the film near the core). In the present invention, pyrolysis of the polymer film starts after the wound film is loosened, and therefore a decomposition gas generated by polymer decomposition is easily discharged to the outside of the film roll through the gaps between the layers of the film. Therefore, the decomposition gas is not retained between the layers of the film, which makes it possible to inhibit the occurrence of fusion bonding between the layers of a carbonized film.

FIG. 1 is a diagram showing the above-described process of loosening and carbonization of a film during temperature rise. Reference numeral 10 denotes a polymer film 50 wound around a core 100. The polymer film is housed in an external tube 200. Reference numeral 20 denotes a state after the wound film is loosened by reducing the pressure in the heating furnace at a temperature lower than the pyrolysis onset temperature. In this state, pyrolysis of the polymer film has not started yet. Reference numeral 30 denotes a state after a carbonized film 80 is obtained by carbonizing the loosened film at a heat-treatment temperature exceeding the pyrolysis onset temperature.

The temperature at which decompression is started in the carbonization step according to the present invention is not particularly limited as long as it is lower than the pyrolysis onset temperature. The decompression may be performed over the entire temperature range lower than the pyrolysis onset temperature, but does not always need to be performed over the entire temperature range lower than the pyrolysis onset temperature. The effect of the present invention can be exerted even when decompression is performed in part of a temperature range lower than the pyrolysis onset temperature without performing decompression in the other part of the temperature range.

The temperature at which temperature rise for performing the carbonization step is started is usually room temperature, and therefore decompression is preferably started at room temperature or higher. The temperature at which decompression is started is preferably 100° C. or higher, more preferably 200° C. or higher, even more preferably 300° C. or higher, particularly preferably 400° C. or higher. The temperature at which decompression performed at lower than the pyrolysis onset temperature is stopped is not particularly limited, but is preferably 500° C. or lower, more preferably 450° C. or lower when the polymer film is, for example, a polyimide film.

Figure 2:
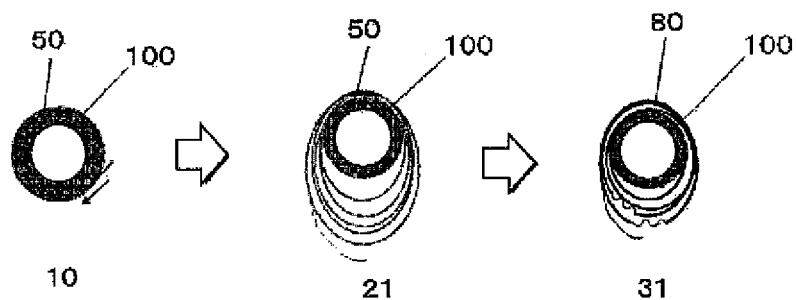
FIG. 2 is a diagram showing how the carbonization of an excessively-loosened film proceeds.

FIG. 2 is a diagram showing how the carbonization of an excessively-loosened film proceeds during temperature rise in the carbonization step. Reference numeral 21 denotes a state after the polymer film 100 is excessively loosened by decompression. In this case, the degree of freedom of the film is high, and therefore the film is likely to be deformed by film shrinkage during carbonization. As a result, as shown by reference numeral 31, waving is likely to occur in the carbonized film 80. However, by stopping the above-described decompression at a temperature of 500° C. or lower, excessive loosening of the film can be inhibited, and therefore the occurrence of waving in a carbonized film can also be inhibited.

When the degree of vacuum during decompression performed at lower than the pyrolysis onset temperature is expressed as absolute pressure, the absolute pressure is preferably 70 kPa or less, more preferably 50 kPa or less, even more preferably 10 kPa or less, even more preferably 1 kPa or less, particularly preferably 0.1 kPa or less. By setting the degree of vacuum to a value as low as 70 kPa or less, it is possible to effectively expand gas trapped between the layers of the film. This makes it possible to loosen the film to such a degree that a decomposition gas can be sufficiently discharged, thereby effectively inhibiting the occurrence of fusion bonding between the layers of a carbonized film. Here, the absolute pressure refers to a pressure relative to a pressure in a perfect vacuum of 0 kPa.

In the carbonization step according to the present invention, the rate of temperature rise in a temperature range lower than the pyrolysis onset temperature is not particularly limited, but is preferably 10° C./min or less, more preferably 5° C./min or less, even more preferably 2° C./min or less. Loosening of a roll of the polymer film starts from the outer peripheral part of the film roll and gradually proceeds, and therefore the central part of the film roll (i.e., the part of the film roll near the core) where loosening of the film is less likely to occur can also be loosened by relatively slowly performing temperature rise to the pyrolysis onset temperature. This makes it possible to prevent the occurrence of fusion bonding in a carbonized film in its entirety.

It is preferred that decompression in a temperature range lower than the pyrolysis onset temperature is performed by the time the temperature of heat treatment reaches the pyrolysis onset temperature and is not performed after the temperature of heat treatment reaches the pyrolysis onset temperature. This makes it possible to prevent the occurrence of cracking in a carbonized film. The film becomes very brittle as carbonization of the polymer film proceeds. Therefore, if the above-described decompression is performed to achieve a low pressure of, for example, 10 kPa or lower in a state where carbonization of the film has proceeded, a load is applied to the film so that cracking is likely to occur in the film. For this reason, decompression to a low pressure is not performed after the temperature of heat treatment reaches the pyrolysis onset temperature, which makes it possible to perform heat treatment under an atmosphere in which a load applied to the film is low and therefore to prevent the occurrence of cracking in a carbonized film.

In the carbonization step according to the present invention, an inert gas is preferably introduced into the heating furnace after the temperature of heat treatment reaches the pyrolysis onset temperature. The flow rate of an inert gas introduced into the heating furnace is not particularly limited, but is preferably 1 L/min or more, more preferably 3 L/min or more, even more preferably 5 L/min or more. When the temperature of heat treatment is increased to the pyrolysis onset temperature or higher, a decomposition gas that causes fusion bonding is generated. However, by introducing an inert gas into the system, the inert gas enters gaps between the layers of the film and pushes the decomposition gas out of a roll of the film through the gaps, which makes it possible to more effectively inhibit the occurrence of fusion bonding. The inert gas is not particularly limited, but for example, nitrogen or argon can be used.

After the temperature of heat treatment reaches the pyrolysis onset temperature, second decompression may be performed at a relatively high pressure. Particularly, the second decompression is preferably performed while an inert gas is introduced into the heating furnace. When the degree of vacuum during the second decompression is expressed as absolute pressure, the absolute pressure is preferably in the range of 21.3 kPa to 101.29 kPa (−0.01 kPa to −80 kPa in terms of relative pressure), more preferably in the range of 61.3 kPa to 101.3 kPa (−1 kPa to −40 kPa in terms of relative pressure). As for temperature conditions under which the second decompression is performed, the temperature of heat treatment is preferably equal to or higher than the pyrolysis onset temperature at which a decomposition gas is generated. When the polymer film is, for example, a polyimide film, the temperature of heat treatment is preferably 500° C. or higher. When decompression is performed to achieve an absolute pressure of 21.3 kPa or higher while an inert gas is introduced in a temperature range in which a decomposition gas is generated, a decomposition gas can be more effectively discharged from between the layers of the film and therefore fusion bonding can be effectively inhibited. At this time, since the degree of vacuum is relatively high, an excessive load is not applied to the film that has become brittle due to the progression of carbonization, and therefore the occurrence of cracking in a carbonized film can be prevented.

Here, the relative pressure is a pressure measured when atmospheric pressure is defined as 0 kPa, and is therefore expressed as a negative value under a reduced pressure.

In the carbonization step, as described above, the polymer film is preferably heat-treated in a state where a roll of the polymer film is housed in the external tube. In this case, a method for heating the polymer film is not particularly limited, but the polymer film is preferably heated from the outside of the external tube. By doing so, carbonization of the polymer film first proceeds in the outer peripheral part and then in the central part of the film roll. In this case, the weight of an obtained carbonized film is about 60% of that of the polymer film, and therefore the load of the outer peripheral part imposed on the central part of the film roll is reduced before carbonization proceeds in the central part of the film roll. By reducing a load imposed on the central part of the polymer film roll before carbonization proceeds in the central part of the film roll, it is possible to prevent an excessive load on the central part of the film roll, thereby effectively preventing the occurrence of fusion bonding after carbonization or the occurrence of cracking.

The orientation of a roll of the film placed in the heating furnace in the carbonization step is not particularly limited, but the film roll is preferably placed laterally (i.e., in such a manner that the axis of the core is in a horizontal position). By placing the film roll laterally, it is possible to avoid applying a load to the widthwise end of the film. This makes it easy to loosen the film, which is effective in inhibiting the occurrence of fusion bonding. Further, a load is uniformly applied in the planar direction of the film even after loosening of the film, and therefore a shrinkage force is uniformly exerted on the film during pyrolysis, which makes it possible to inhibit deformation of a carbonized film.

(Graphitization Step)

When a graphite film is produced, the graphitization step is performed after the carbonization step. The graphitization step is a step in which a carbonized film produced in the carbonization step is heat-treated at a temperature of 2400° C. or higher. By performing this step, it is possible to graphitize the carbonized film to obtain a graphite film having high thermal conductivity. When the carbonized film is changed to a graphite film, its thermal conductivity is significantly improved and its size is increased by about 10%.

When a graphite film is produced from a polymer film, the carbonization step and the graphitization step may be performed continuously or only the graphitization step may be performed separately after the completion of the carbonization step.

A carbonized film wound around a core obtained in the carbonization step may be directly subjected to the graphitization step. Alternatively, the carbonized film may be unwound from the core and cut into pieces of a desired size and, if necessary, the pieces of the film may be stacked before the graphitization step is performed.

Further, a graphite film obtained in the graphitization step may be subjected to a press step to impart excellent flexibility.

EXAMPLES

Hereinbelow, the present invention will be described in more detail with reference to examples, but is not limited to these examples.

Figure 3:
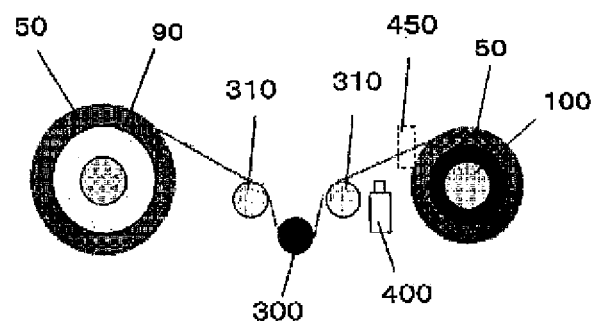
FIG. 3 is a conceptual diagram showing how a polymer film was rewound while one of the surfaces of the film was diselectrified in examples.

FIG. 3 is a conceptual diagram showing how a polymer film was rewound (wound) in the following examples. As shown in FIG. 3, a polymer film 50 first wound around a cylinder 90 is rewound around a core 100 suitable for the carbonization step. Two guide rollers 310 are provided between the cylinder 90 and the core 100 to support the polymer film. Further, a pick-up roller 300 is provided between the two guide rollers 310 to apply a predetermined tension to the polymer film. A diselectrifying device 400 is provided to face one of the surfaces of the polymer film so that the one of the surfaces of the polymer film can be diselectrified before the polymer film is wound around the core 100. A charge amount measuring point 450 is provided to measure the amount of charge just after the polymer film passes through the diselectrifying device 400 but just before it is wound around the core 100.

Figure 7:
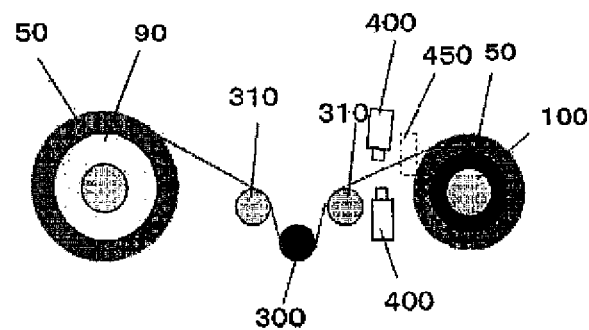
FIG. 7 is a conceptual diagram showing how a polymer film was rewound while both surfaces of the film were diselectrified in examples.

FIG. 7 is the same as FIG. 3 except that an additional diselectrifying device 400 is provided to face the other surface of the polymer film so that the both surfaces of the polymer film can be diselectrified.

Figure 8:
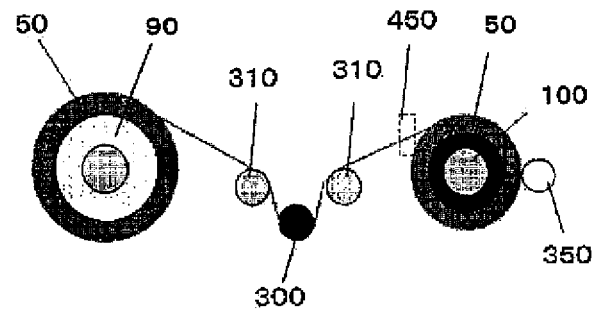
FIG. 8 is a conceptual diagram showing how a polymer film was rewound while being pressed using a nip roller in examples.

FIG. 8 is the same as FIG. 3 except that a nip roller 350 is provided to press the polymer film wound around the core 100 and that the diselectrifying device 400 is not shown.

Figure 9:
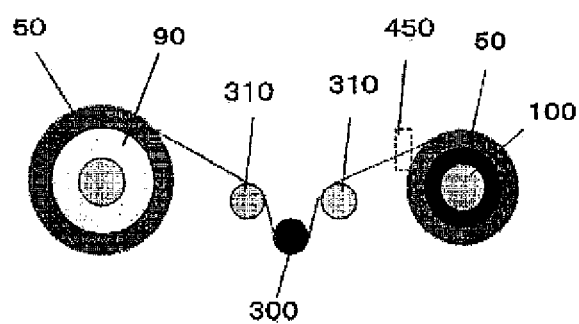
FIG. 9 is a conceptual diagram showing how a polymer film was rewound without diselectrifying the film in examples.

FIG. 9 is the same as FIG. 3 except that the diselectrifying device is not provided to omit diselectrification of the polymer film.

Figure 4:
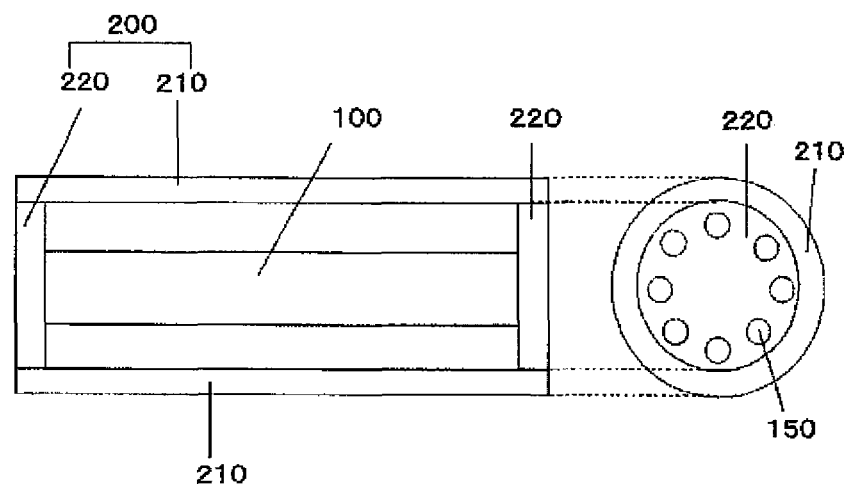
FIG. 4 shows a sectional side view and a top view of a container used in examples and having an external tube and a core provided inside the external tube.

FIG. 4 is a schematic diagram of a container a, b, c, d, e, or f used in the following examples and having an external tube and a core provided inside the external tube, wherein a longitudinal sectional view of the container a, b, c, d, e, or f is shown on the left side and a side view of the container a, b, c, d, e, or f is shown on the right side.

(Container a)

The container a includes: an external tube 200 obtained by fitting a circular plate 220 having a diameter of 130 mm and a thickness of 10 mm to each of the ends of a cylinder 210 having an inner diameter of 130 mm, a height of 570 mm, and a thickness of 5 mm; and a core 100 provided inside the external tube 200 and having a diameter of 100 mm, a height of 550 mm, and a thickness of 5 mm. Each of the two circular plates 220 has 8 gas vents each having a diameter of 7 mm. Both the external tube 200 and the core 100 are made of isotropic graphite.

(Container b)

The container b is the same as the container a except that the inner diameter of the cylinder 210 is changed to 125 mm and the diameter of the circular plate 220 is changed to 125 mm.

(Container c)

The container c is the same as the container a except that the inner diameter of the cylinder 210 is changed to 140 mm and the diameter of the circular plate 220 is changed to 140 mm.

(Container d)

The container d is the same as the container a except that the inner diameter of the cylinder 210 is changed to 150 mm and the diameter of the circular plate 220 is changed to 150 mm.

(Container e)

The container e is the same as the container a except that the inner diameter of the cylinder 210 is changed to 160 mm and the diameter of the circular plate 220 is changed to 160 mm.

(Container f)

The container f is the same as the container a except that the inner diameter of the cylinder 210 is changed to 180 mm and the diameter of the circular plate 220 is changed to 180 mm.

Figure 5:
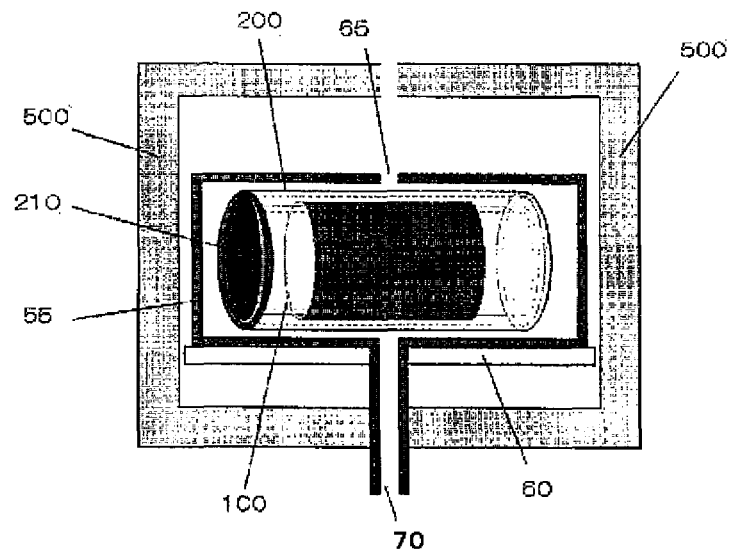
FIG. 5 is a diagram showing how the container was placed in an electric furnace in examples.

FIG. 5 is a diagram showing how the container was placed in an electric furnace (heating furnace) in the following examples. The polymer film wound around the core 100 is housed in the external tube 200 and is further housed in an inner case 55. The inner case 55 is placed on a stage 60 in a heater 500. Each of the inner case 55 and the heater 500 has an inlet port 65 through which gas can be introduced and an exhaust port 70 through which gas can be discharged.

(Measurement of Amount of Charge)

In Examples 61 to 103, the amount of charge in each of the surfaces of the polymer film 50 was measured at the charge amount measuring point 450 shown in FIGS. 3, 7, and 8 using a high-accuracy electrostatic sensor SK (manufactured by Keyence Corporation) just before the polymer film 50 was wound around the core 100.

(Measurement of Winding Tension)

A winding tension was measured using a strain gauge-type tension meter manufactured by Eiko Sokki Co., Ltd. attached to the pick-up roller 300 shown in FIGS. 3, 7, and 8.

It is to be noted that in Examples 61 to 103, the winding-start tension Ps refers to a tension measured when a point 3 m apart from the winding-start end of the film passes through a measurement point after the start of winding of the film at a predetermined speed, and the winding-end tension Pe refers to a tension measured when a point 3 m apart from the winding-end end of the film passes through the measurement point.

<Evaluation Methods>

(Fusion Bonding)

After the carbonization step, the side surfaces of an obtained roll of a carbonized film were observed, and the number of layers of the carbonized film where fusion bonding occurred was counted to evaluate the carbonized film according to the following criteria. When being rated "A" to "D", the carbonized film is regarded as acceptable.

A: No fusion bonding was observed.
B: Fusion bonding was observed in 2 or 3 layers of the film.
C: Fusion bonding was observed in 4 to 9 layers of the film.
D: Fusion bonding was observed in 10 to 19 layers of the film.
E: Fusion bonding was observed in 20 or more layers of the film.

(Waving)

Figure 6:
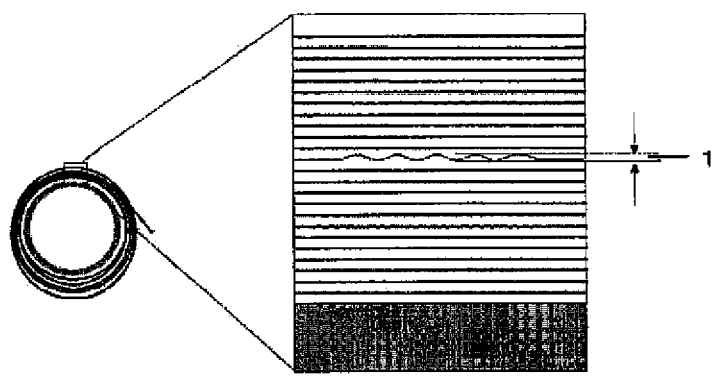
FIG. 6 is a diagram showing how waving occurs in a carbonized film wound into a roll.

FIG. 6 is a conceptual diagram showing how waving occurs in a carbonized film wound into a roll. In FIG. 6, a side view of the carbonized film roll is shown on the left side and a partially-enlarged side view of the carbonized film roll is shown on the right side. In the enlarged side view, the occurrence of waving is observed in part of the carbonized film, and the amplitude of the waving is indicated by reference numeral 1.

After the carbonization step, the side surfaces of an obtained roll of a carbonized film were observed, and the amplitude of waving occurring in the film was measured and the number of layers of the film where waving occurred was counted to evaluate the carbonized film according to the following criteria. When being rated "A" or "B", the carbonized film is regarded as acceptable.

A: No waving whose amplitude was 3.1 mm or more was observed and waving whose amplitude was 1.0 mm to 3.0 mm was observed in 15 or less layers of the film.

B: Waving whose amplitude was 1.0 mm to 3.0 mm was observed in 16 to 30 layers of the film or waving whose amplitude was 3.1 mm or more was observed in 1 to 10 layers of the film.

C: Waving whose amplitude was 1.0 mm to 3.0 mm was observed in 31 layers or more of the film or waving whose amplitude was 3.1 mm or more was observed in 10 or more layers of the film.

(Cracking)

After the carbonization step, an obtained carbonized film was observed, and the number of layers of the film where cracking occurred was counted to evaluate the carbonized film according to the following criteria. When being rated "A" to "C", the carbonized film is regarded as acceptable.

A: No cracking was observed.
B: Cracking was observed in 1 to 5 layers of the film.
C: Cracking was observed in 6 to 10 layers of the film.
D: Cracking was observed in 11 or more layers of the film.

Example 1

A polyimide film having a width of 500 mm and a length of 50 m (manufactured by Kaneka Corporation under the trade name of APICAL 200AV film, thickness: 50 µm) was prepared as a polymer film. The polymer film was rewound around the central part of a core having a diameter of 100 mm, and was housed in an external tube. As a container, the container a was used. The rewinding (winding) of the polymer film was performed in such a manner as shown in FIG. 3 at a winding tension of 100 N/m and a winding speed of 10 m/min while one of the surfaces of the film was dielectrified by the dielectrifying device 400.

As shown in FIG. 5, the container a in which the polymer film was set was placed laterally (horizontally) in the electric furnace. The temperature in the furnace was increased from room temperature to 450° C. at a rate of 1° C./min by electrically heating the heater 500 provided outside. At this time, decompression was performed so that the pressure in the furnace was 0.04 kPa (absolute pressure). Then, the pressure in the furnace was returned to atmospheric pressure by introducing nitrogen. Then, the temperature in the furnace was increased to 1000° C. at a rate of 1° C./min while nitrogen gas was introduced into the furnace at a flow rate of 5 L/min to perform carbonization. Here, the nitrogen gas was introduced through the inlet port 65 and exhaust was discharged through the exhaust port 70. The results are shown in Table 1.

Example 2

A carbonized film was obtained in the same manner as in Example 1 except that the flow rate of nitrogen gas was changed to 1 L/min. The results are shown in Table 1.

Example 3

A carbonized film was obtained in the same manner as in Example 1 except that the flow rate of nitrogen gas was changed to 1 L/min and that the external tube was not used. The results are shown in Table 1.

Example 4

A carbonized film was obtained in the same manner as in Example 1 except that nitrogen gas was not introduced into the furnace after the pressure in the furnace was returned to atmospheric pressure by introducing nitrogen into the furnace after the completion of decompression. The results are shown in Table 1.

Example 5

A carbonized film was obtained in the same manner as in Example 1 except that the external tube was not used and that nitrogen gas was not introduced into the furnace after the pressure in the furnace was returned to atmospheric pressure by introducing nitrogen into the furnace after the completion of decompression. The results are shown in Table 1.

Example 6

A carbonized film was obtained in the same manner as in Example 1 except that heat treatment was performed at a furnace pressure of 0.04 kPa (absolute pressure) without introducing nitrogen into the furnace during an increase in temperature in the furnace from room temperature to 1000° C. The results are shown in Table 1.

Comparative Example 1

A polyimide film having a width of 500 mm and a length of 50 m (manufactured by Kaneka Corporation under the trade name of APICAL 200AV film, thickness: 50 μm) was prepared as a polymer film and rewound around the central part of a core having a diameter of 100 mm. The polymer film wound around the core was not housed in an external tube. The rewinding of the polymer film was performed in such a manner as shown in FIG. 3 at a tension of 100 N/m and a winding speed of 10 m/min while one of the surfaces of the film was diselectrified by the diselectrifying device 400. It is to be noted that the tension was detected using the pick-up roller 300 shown in FIG. 3.

The polymer film wound around the core was placed laterally in the electric furnace. The temperature in the furnace was increased from room temperature to 1000° C. at a rate of 1° C./min by electrically heating the heater 500 provided outside to perform carbonization. At this time, nitrogen gas was not introduced into the furnace and the pressure in the furnace was adjusted to 103.3 kPa in terms of absolute pressure (+2 kPa in terms of relative pressure). The results are shown in Table 1.

Comparative Example 2

A carbonized film was obtained in the same manner as in Comparative Example 1 except that the polymer film wound around the core was housed in the external tube of the container a. The results are shown in Table 1.

Comparative Example 3

A carbonized film was obtained in the same manner as in Comparative Example 1 except that the pressure in the furnace during an increase in temperature in the furnace to 1000° C. was changed to 101.3 kPa in terms of absolute pressure (±0 kPa in terms of relative pressure) and that the polymer film wound around the core was housed in the external tube of the container a. The results are shown in Table 1.

Comparative Example 4

A carbonized film was obtained in the same manner as in Comparative Example 1 except that the temperature in the furnace was increased from room temperature to 450° C. at a rate of 1° C./min so that the pressure in the furnace was 103.3 kPa in terms of absolute pressure (+20 kPa in terms of relative pressure) without introducing nitrogen gas and then carbonization was performed by increasing the temperature in the furnace to 1000° C. at the same rate while nitrogen gas was introduced into the furnace at a flow rate of 1 L/min and that the polymer film wound around the core was housed in the external tube of the container a. The results are shown in Table 1.

Comparative Example 5

A carbonized film was obtained in the same manner as in Comparative Example 1 except that the temperature in the furnace was increased from room temperature to 550° C. at a rate of 1° C./min so that the pressure in the furnace was 101.3 kPa in terms of absolute pressure (±0 kPa in terms of relative pressure) without introducing nitrogen gas and then carbonization was performed by increasing the temperature in the furnace to 1000° C. at the same rate while the pressure in the furnace was reduced to 0.04 kPa in terms of absolute pressure and that the polymer film wound around the core was housed in the external tube of the container a. The results are shown in Table 1.

TABLE 1

| | Raw Material Film | | | Decompression Conditions | | Conditions after Decompression | | Presence or Absence of Restraint |
| | Thickness μm | Length m | Width mm | Temperature | Degree of Vacuum (Absolute Pressure) | Temperature | Flow Rate of Nitrogen | |
|---|---|---|---|---|---|---|---|---|
| Example 1 | 50 | 50 | 500 | R.T.-450° C. | 0.04 kPa | 450° C.-1000° C. | 5.0 L/min | Absent |
| Example 2 | 50 | 50 | 500 | R.T.-450° C. | 0.04 kPa | 450° C.-1000° C. | 1.0 L/min | Absent |
| Example 3 | 50 | 50 | 500 | R.T.-450° C. | 0.04 kPa | 450° C.-1000° C. | 1.0 L/min | Absent |
| Example 4 | 50 | 50 | 500 | R.T.-450° C. | 0.04 kPa | 450° C.-1000° C. | — | Absent |
| Example 5 | 50 | 50 | 500 | R.T.-450° C. | 0.04 kPa | 450° C.-1000° C. | — | Absent |
| Comparative Example 1 | 50 | 50 | 500 | R.T.-1000° C. | 103.3 kPa | — | — | Absent |
| Comparative Example 2 | 50 | 50 | 500 | R.T.-1000° C. | 103.3 kPa | — | — | Absent |
| Comparative Example 3 | 50 | 50 | 500 | R.T.-1000° C. | 101.3 kPa | — | — | Absent |
| Comparative Example 4 | 50 | 50 | 500 | R.T.-450° C. | 103.3 kPa | — | 1.0 L/min | Absent |
| Example 6 | 50 | 50 | 500 | R.T.-1000° C. | 0.04 kPa | — | — | Absent |
| Comparative Example 5 | 50 | 50 | 500 | 550° C.-1000° C. | 0.04 kPa | — | — | Absent |

TABLE 1-continued

| | Container | | | | | | | | Evaluations | | |
| --- | --- | --- | --- | --- | --- | --- | --- | --- | --- | --- | --- |
| | | Inner | | | | | | Fusion Bonding | | | |
| | Diameter of Core mm | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | Cracking | Waving |
| Example 1 | 100 | Present | 130 | 7.5 | 2.0 | Lateral | 1 | Outside | 0 | A | A | A |
| Example 2 | 100 | Present | 130 | 7.5 | 2.0 | Lateral | 1 | Outside | 3 | B | A | A |
| Example 3 | 100 | Absent | Absent | 7.5 | — | Lateral | 1 | Outside | 0 | A | B | C |
| Example 4 | 100 | Present | 130 | 7.5 | 2.0 | Lateral | 1 | Outside | 5 | C | A | A |
| Example 5 | 100 | Absent | Absent | 7.5 | — | Lateral | 1 | Outside | 4 | C | B | C |
| Comparative Example 1 | 100 | Absent | 130 | 7.5 | 2.0 | Lateral | 1 | Outside | 30 | E | C | B |
| Comparative Example 2 | 100 | Present | 130 | 7.5 | 2.0 | Lateral | 1 | Outside | 30 | E | C | B |
| Comparative Example 3 | 100 | Present | 130 | 7.5 | 2.0 | Lateral | 1 | Outside | 20 | E | A | B |
| Comparative Example 4 | 100 | Present | 130 | 7.5 | 2.0 | Lateral | 1 | Outside | 20 | E | C | B |
| Example 6 | 100 | Present | 130 | 7.5 | 2.0 | Lateral | 1 | Outside | 0 | A | D | C |
| Comparative Example 5 | 100 | Present | 130 | 7.5 | 2.0 | Lateral | 1 | Outside | 9 | C | D | C |

In Comparative Examples 1 to 4 in which decompression was not performed at all in the carbonization step, fusion bonding occurred in many layers of the film. However, in Example 5, the occurrence of fusion bonding was significantly reduced by performing decompression in a temperature range lower than the carbonization/decomposition onset temperature.

As described above, the reason why fusion bonding occurs is that a decomposition gas generated during the pyrolysis of a polymer film is retained between the layers of the film and then adheres to the film after cooling and functions like an adhesive between the layers of the film.

When a polymer film is wound into a roll, gas (usually air or nitrogen) is trapped between the layers of the film. Therefore, the gas present between the layers of the film is expanded by performing heating and decompression and pushes up the film so that the wound film is loosened and gaps are created between the layers of the film. A decomposition gas generated by pyrolysis can be easily discharged to the outside of a roll of the polymer film through the gaps between the layers of the film, and therefore does not adhere to the film even after cooling, which makes it possible to inhibit the occurrence of fusion bonding.

That is, the object of the present invention can be achieved by loosening a wound film and creating gaps between the layers of the film before the start of pyrolysis.

However, as in Comparative Examples 1 to 4, when only heating is performed without performing decompression, the expansion force of gas is not adequate. As described above, loosening of a wound film starts from the outer peripheral part of a roll of the film and gradually proceeds, and therefore the central part of the film roll cannot be adequately loosened. For this reason, it is considered that, in Comparative Examples 1 to 4, it was difficult to discharge a decomposition gas from between the layers of the film particularly in the central part of a roll of the film, which caused fusion bonding after cooling. On the other hand, it is considered that, in Example 5, the expansion force of gas between the layers of the film could be improved by performing decompression in a temperature range lower than the carbonization/decomposition onset temperature and therefore the wound film was adequately loosened to around the central part of a roll of the film, which made it possible to inhibit the occurrence of fusion bonding.

In Example 4, the occurrence of waving and cracking in the carbonized film could be reduced as compared to Example 5 by providing the external tube. As described above, as carbonization proceeds during pyrolysis, the film shrinks. When the degree of freedom of the film is high during shrinkage of the film, the film is likely to be deformed and therefore waving is likely to occur. For this reason, it is considered that, in Example 4, the occurrence of waving was reduced by controlling the degree of freedom of the polymer film by providing the external tube to prevent excessive loosening of the film. Further, as described above, the degree of freedom of a film in the outer peripheral part of a roll of the film is inherently high, and therefore the film in the outer peripheral part of the film roll is likely to be moved by stress generated by shrinkage during carbonization. For this reason, it is considered that, in Example 4, the occurrence of cracking was also reduced by controlling the degree of freedom of the film by providing the external tube. On the other hand, when the external tube was provided, the number of layers where fusion bonding occurred was slightly increased as compared to a case where the external tube was not provided. It is considered that the reason for this is that loosening of the film was inhibited by providing the external tube.

In Example 3, the occurrence of fusion bonding could be further reduced as compared to Examples 4 and 5 by introducing nitrogen gas into the furnace after the completion of decompression. As described above, a decomposition gas generated by pyrolysis is likely to be retained between the layers of a film, which causes fusion bonding. For this reason, it is considered that, in Example 3, a decomposition gas retained between the layers of the film could be guided to the outside of a roll of the film by introducing nitrogen gas after the start of pyrolysis, which made it possible to reduce the occurrence of fusion bonding.

In Example 2, the occurrence of all of fusion bonding, cracking, and waving could be reduced as compared to Example 5 by providing the external tube and by introducing nitrogen gas into the furnace after the completion of decompression.

Further, in Example 1, the occurrence of fusion bonding could be further reduced as compared to Example 2 by increasing the flow rate of nitrogen gas.

In Comparative Example 5, decompression was not performed in a temperature range lower than the pyrolysis onset temperature but was performed only in a temperature range of the pyrolysis onset temperature or higher, and therefore the wound film was not adequately loosened before pyrolysis so that fusion bonding occurred in many layers of the film. Further, since decompression was performed in the course of pyrolysis, a decomposition gas tried to come out from between the layers of the film at once and therefore an excessive load was applied to the film so that cracking occurred in many layers of the produced carbonized film. It is considered that the reason for this is that a load caused by decompression was applied to the polymer film that was becoming brittle by pyrolysis in the process of changing to a carbonized film.

In Example 6, the occurrence of fusion bonding could be reduced as compared to Example 5 by performing decompression not only in a temperature range lower than the pyrolysis onset temperature but also in a temperature range of the pyrolysis onset temperature or higher.

Example 7

A carbonized film was obtained in the same manner as in Example 1 except that the flow rate of nitrogen gas was changed to 10 L/min. The results are shown in Table 2.

Example 8

A carbonized film was obtained in the same manner as in Example 1 except that the flow rate of nitrogen gas was changed to 3 L/min. The results are shown in Table 2.

Example 9

A carbonized film was obtained in the same manner as in Example 1 except that the pressure in the furnace was changed to 10 kPa and that the flow rate of nitrogen gas was changed to 10 L/min. The results are shown in Table 2.

Example 10

A carbonized film was obtained in the same manner as in Example 1 except that the pressure in the furnace was changed to 10 kPa. The results are shown in Table 2.

Example 11

A carbonized film was obtained in the same manner as in Example 1 except that the pressure in the furnace was changed to 10 kPa and that the flow rate of nitrogen gas was changed to 3 L/min. The results are shown in Table 2.

Example 12

A carbonized film was obtained in the same manner as in Example 1 except that the pressure in the furnace was changed to 10 kPa and that the flow rate of nitrogen gas was changed to 1 L/min. The results are shown in Table 2.

Example 13

A carbonized film was obtained in the same manner as in Example 1 except that pressure in the furnace was changed to 10 kPa and that nitrogen gas was not introduced into the furnace after the pressure in the furnace was returned to atmospheric pressure by introducing nitrogen into the furnace after the completion of decompression. The results are shown in Table 2.

TABLE 2

| | Raw Material Film | | | | Decompression Conditions | | | Presence |
|---|---|---|---|---|---|---|---|---|
| | | | | | Degree of Vacuum | Conditions after Decompression | | |
| | Thickness μm | Length m | Width mm | Temperature | (Absolute Pressure) | Temperature | Flow Rate of Nitrogen | or Absence of Restraint |
| Example 7 | 50 | 50 | 500 | R.T.-450° C. | 0.04 kPa | 450° C.-1000° C. | 10 L/min | Absent |
| Example 1 | 50 | 50 | 500 | R.T.-450° C. | 0.04 kPa | 450° C.-1000° C. | 5.0 L/min | Absent |
| Example 8 | 50 | 50 | 500 | R.T.-450° C. | 0.04 kPa | 450° C.-1000° C. | 3.0 L/min | Absent |
| Example 3 | 50 | 50 | 500 | R.T.-450° C. | 0.04 kPa | 450° C.-1000° C. | 1.0 L/min | Absent |
| Example 4 | 50 | 50 | 500 | R.T.-450° C. | 0.04 kPa | 450° C.-1000° C. | — | Absent |
| Example 9 | 50 | 50 | 500 | R.T.-450° C. | 10 kPa | 450° C.-1000° C. | 10 L/min | Absent |
| Example 10 | 50 | 50 | 500 | R.T.-450° C. | 10 kPa | 450° C.-1000° C. | 5.0 L/min | Absent |
| Example 11 | 50 | 50 | 500 | R.T.-450° C. | 10 kPa | 450° C.-1000° C. | 3.0 L/min | Absent |
| Example 12 | 50 | 50 | 500 | R.T.-450° C. | 10 kPa | 450° C.-1000° C. | 1.0 L/min | Absent |
| Example 13 | 50 | 50 | 500 | R.T.-450° C. | 10 kPa | 450° C.-1000° C. | — | Absent |

| | Container | | | | | | Evaluations | | | |
|---|---|---|---|---|---|---|---|---|---|---|
| | | | Inner | | | | | Fusion Bonding | | |
| | Diameter of Core mm | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | Cracking | Waving |
| Example 7 | 100 | Present | 130 | 7.5 | 2.0 | Lateral | 1 | Outside | 0 | A | A | A |
| Example 1 | 100 | Present | 130 | 7.5 | 2.0 | Lateral | 1 | Outside | 0 | A | A | A |
| Example 8 | 100 | Present | 130 | 7.5 | 2.0 | Lateral | 1 | Outside | 0 | A | A | A |
| Example 3 | 100 | Present | 130 | 7.5 | 2.0 | Lateral | 1 | Outside | 3 | B | A | A |
| Example 4 | 100 | Present | 130 | 7.5 | 2.0 | Lateral | 1 | Outside | 5 | C | A | A |
| Example 9 | 100 | Present | 130 | 7.5 | 2.0 | Lateral | 1 | Outside | 3 | B | A | A |

TABLE 2-continued

| | | | | | | | | | | | | |
|---|---|---|---|---|---|---|---|---|---|---|---|---|
| Example 10 | 100 | Present | 130 | 7.5 | 2.0 | Lateral | 1 | Outside | 3 | B | A | A |
| Example 11 | 100 | Present | 130 | 7.5 | 2.0 | Lateral | 1 | Outside | 4 | C | A | A |
| Example 12 | 100 | Present | 130 | 7.5 | 2.0 | Lateral | 1 | Outside | 6 | C | A | A |
| Example 13 | 100 | Present | 130 | 7.5 | 2.0 | Lateral | 1 | Outside | 9 | C | A | A |

As can be seen from the results shown in Table 2, the occurrence of fusion bonding was reduced by increasing the flow rate of nitrogen gas introduced into the furnace after the completion of decompression performed in a temperature range lower than the pyrolysis onset temperature. It is considered that the reason for this is that a decomposition gas could be more efficiently discharged from between the layers of the film by increasing the flow rate of nitrogen gas. However, the effect of inhibiting the occurrence of fusion bonding was not enhanced in proportion to the flow rate of nitrogen gas even when the flow rate of nitrogen gas was increased to 5 L/min or more.

Example 14

A carbonized film was obtained in the same manner as in Example 1 except that the pressure in the furnace was changed to 1 kPa. The results are shown in Table 3.

Example 15

A carbonized film was obtained in the same manner as in Example 1 except that the pressure in the furnace was changed to 3 kPa. The results are shown in Table 3.

Example 16

A carbonized film was obtained in the same manner as in Example 1 except that the pressure in the furnace was changed to 50 kPa. The results are shown in Table 3.

Example 17

A carbonized film was obtained in the same manner as in Example 1 except that the pressure in the furnace was changed to 1 kPa and that nitrogen gas was not introduced into the furnace after the pressure in the furnace was returned to atmospheric pressure by introducing nitrogen after the completion of decompression. The results are shown in Table 3.

Example 18

A carbonized film was obtained in the same manner as in Example 1 except that decompression was performed for 10 minutes only when the temperature in the furnace was room temperature. The results are shown in Table 3.

Example 19

A carbonized film was obtained in the same manner as in Example 1 except that decompression was performed while the temperature in the furnace was increased from room temperature to 100° C. The results are shown in Table 3.

Example 20

A carbonized film was obtained in the same manner as in Example 1 except that decompression was performed while the temperature in the furnace was increased from room temperature to 200° C. The results are shown in Table 3.

Example 21

A carbonized film was obtained in the same manner as in Example 1 except that decompression was performed while the temperature in the furnace was increased from room temperature to 300° C. The results are shown in Table 3.

Example 22

A carbonized film was obtained in the same manner as in Example 1 except that decompression was performed while the temperature in the furnace was increased from room temperature to 400° C. The results are shown in Table 3.

Example 23

A carbonized film was obtained in the same manner as in Example 1 except that decompression was performed while the temperature in the furnace was increased from room temperature to 500° C. The results are shown in Table 3.

Example 24

A carbonized film was obtained in the same manner as in Example 1 except that, after the temperature in the furnace was increased from room temperature to 100° C. at atmospheric pressure under nitrogen atmosphere, decompression was performed while the temperature in the furnace was increased from 100° C. to 200° C. The results are shown in Table 3.

Example 25

A carbonized film was obtained in the same manner as in Example 1 except that, after the temperature in the furnace was increased from room temperature to 200° C. at atmospheric pressure under nitrogen atmosphere, decompression was performed while the temperature in the furnace was increased from 200° C. to 300° C. The results are shown in Table 3.

Example 26

A carbonized film was obtained in the same manner as in Example 1 except that, after the temperature in the furnace was increased from room temperature to 300° C. at atmospheric pressure under nitrogen atmosphere, decompression was performed while the temperature in the furnace was increased from 300° C. to 400° C. The results are shown in Table 3.

Example 27

A carbonized film was obtained in the same manner as in Example 1 except that, after the temperature in the furnace was increased from room temperature to 400° C. at atmospheric pressure under nitrogen atmosphere, decompression was performed while the temperature in the furnace was increased from 400° C. to 500° C. The results are shown in Table 3.

TABLE 3

| | Raw Material Film | | | Decompression Conditions | | Conditions after Decompression | | Presence or Absence of Restraint |
|---|---|---|---|---|---|---|---|---|
| | Thickness μm | Length m | Width mm | Temperature | Degree of Vacuum (Absolute Pressure) | Temperature | Flow Rate of Nitrogen | |
| Example 1 | 50 | 50 | 500 | R.T.-450° C. | 0.04 kPa | 450° C.-1000° C. | 5.0 L/min | Absent |
| Example 14 | 50 | 50 | 500 | R.T.-450° C. | 1 kPa | 450° C.-1000° C. | 5.0 L/min | Absent |
| Example 15 | 50 | 50 | 500 | R.T.-450° C. | 3 kPa | 450° C.-1000° C. | 5.0 L/min | Absent |
| Example 11 | 50 | 50 | 500 | R.T.-450° C. | 10 kPa | 450° C.-1000° C. | 5.0 L/min | Absent |
| Example 16 | 50 | 50 | 500 | R.T.-450° C. | 50 kPa | 450° C.-1000° C. | 5.0 L/min | Absent |
| Example 4 | 50 | 50 | 500 | R.T.-450° C. | 0.04 kPa | 450° C.-1000° C. | — | Absent |
| Example 17 | 50 | 50 | 500 | R.T.-450° C. | 1 kPa | 450° C.-1000° C. | — | Absent |
| Example 13 | 50 | 50 | 500 | R.T.-450° C. | 10 kPa | 450° C.-1000° C. | — | Absent |
| Example 18 | 50 | 50 | 500 | only at R.T. | 0.04 kPa | R.T.-1000° C. | 5.0 L/min | Absent |
| Example 19 | 50 | 50 | 500 | R.T.-100° C. | 0.04 kPa | 200° C.-1000° C. | 5.0 L/min | Absent |
| Example 20 | 50 | 50 | 500 | R.T.-200° C. | 0.04 kPa | 200° C.-1000° C. | 5.0 L/min | Absent |
| Example 21 | 50 | 50 | 500 | R.T.-300° C. | 0.04 kPa | 300° C.-1000° C. | 5.0 L/min | Absent |
| Example 22 | 50 | 50 | 500 | R.T.-400° C. | 0.04 kPa | 400° C.-1000° C. | 5.0 L/min | Absent |
| Example 23 | 50 | 50 | 500 | R.T.-500° C. | 0.04 kPa | 500° C.-1000° C. | 5.0 L/min | Absent |
| Example 24 | 50 | 50 | 500 | 100° C.-200° C. | 0.04 kPa | 200° C.-1000° C. | 5.0 L/min | Absent |
| Example 25 | 50 | 50 | 500 | 200° C.-300° C. | 0.04 kPa | 300° C.-1000° C. | 5.0 L/min | Absent |
| Example 26 | 50 | 50 | 500 | 300° C.-400° C. | 0.04 kPa | 400° C.-1000° C. | 5.0 L/min | Absent |
| Example 27 | 50 | 50 | 500 | 400° C.-450° C. | 0.04 kPa | 450° C.-1000° C. | 5.0 L/min | Absent |

| | Container | | | | | | Evaluations | | | |
|---|---|---|---|---|---|---|---|---|---|---|
| | Diameter of Core mm | Presence or Absence of External Tube | Inner Diameter of External Tube mm | Thickness of Film Roll mm | a/b | Orientation | Rate of Temperature Rise to 450° C. ° C./min | Heated Part | Fusion Bonding Number of Layers where Fusion Bonding Occurred | Cracking | Waving |
| Example 1 | 100 | Present | 130 | 7.5 | 2.0 | Lateral | 1 | Outside | 0 | A | A | A |
| Example 14 | 100 | Present | 130 | 7.5 | 2.0 | Lateral | 1 | Outside | 0 | A | A | A |
| Example 15 | 100 | Present | 130 | 7.5 | 2.0 | Lateral | 1 | Outside | 0 | A | A | A |
| Example 11 | 100 | Present | 130 | 7.5 | 2.0 | Lateral | 1 | Outside | 3 | B | A | A |
| Example 16 | 100 | Present | 130 | 7.5 | 2.0 | Lateral | 1 | Outside | 8 | C | A | A |
| Example 4 | 100 | Present | 130 | 7.5 | 2.0 | Lateral | 1 | Outside | 5 | C | A | A |
| Example 17 | 100 | Present | 130 | 7.5 | 2.0 | Lateral | 1 | Outside | 7 | C | A | A |
| Example 13 | 100 | Present | 130 | 7.5 | 2.0 | Lateral | 1 | Outside | 10 | D | A | A |
| Example 18 | 100 | Present | 130 | 7.5 | 2.0 | Lateral | 1 | Outside | 12 | D | A | A |
| Example 19 | 100 | Present | 130 | 7.5 | 2.0 | Lateral | 1 | Outside | 12 | D | A | A |
| Example 20 | 100 | Present | 130 | 7.5 | 2.0 | Lateral | 1 | Outside | 10 | D | A | A |
| Example 21 | 100 | Present | 130 | 7.5 | 2.0 | Lateral | 1 | Outside | 3 | B | A | A |
| Example 22 | 100 | Present | 130 | 7.5 | 2.0 | Lateral | 1 | Outside | 3 | B | A | A |
| Example 23 | 100 | Present | 130 | 7.5 | 2.0 | Lateral | 1 | Outside | 0 | A | A | B |
| Example 24 | 100 | Present | 130 | 7.5 | 2.0 | Lateral | 1 | Outside | 10 | D | A | A |
| Example 25 | 100 | Present | 130 | 7.5 | 2.0 | Lateral | 1 | Outside | 3 | B | A | A |
| Example 26 | 100 | Present | 130 | 7.5 | 2.0 | Lateral | 1 | Outside | 3 | B | A | A |
| Example 27 | 100 | Present | 130 | 7.5 | 2.0 | Lateral | 1 | Outside | 0 | A | A | A |

As can be seen from a comparison among Examples 1, 14, 15, 11, and 16, the effect of inhibiting the occurrence of fusion bonding was enhanced by increasing the degree of vacuum during decompression performed in a temperature range lower than the pyrolysis onset temperature. It is considered that the reason for this is that expansion of gas present between the layers of the film was promoted by increasing the degree of vacuum, which made it easy to loosen the film. Further, as can be seen from a comparison among Examples 4, 17, and 13, even when nitrogen gas was not introduced into the furnace after the completion of decompression, the effect of inhibiting the occurrence of fusion bonding was enhanced by increasing the degree of vacuum during decompression.

As can be seen from a comparison among Examples 1 and 18 to 23 and a comparison among Examples 24 to 27, the effect of inhibiting the occurrence of fusion bonding was enhanced by performing decompression in a higher temperature range lower than the pyrolysis onset temperature. It is considered that the reason for this is that the effect of expanding gas present between the layers of the film was enhanced by performing decompression in a higher temperature range. Particularly, as can be seen from the comparisons, the effect of inhibiting the occurrence of fusion bonding was enhanced when decompression was performed in a temperature range of 200° C. or higher.

It is to be noted that in Example 23 in which decompression was continued until the temperature in the furnace was increased to 500° C., the occurrence of fusion bonding was inhibited but waving occurred in some degree. It is considered that the reason for this is that the degree of freedom of the polymer film was increased by excessive loosening of the film because evaporation of an additive or the like added to the polymer film was promoted by performing decompression at high temperature, and the film was deformed by shrinkage during carbonization.

Example 28

A carbonized film was obtained in the same manner as in Example 1 except that the rate of increase in the temperature in the furnace to 450° C. was changed to 2° C./min. The results are shown in Table 4.

A carbonized film was obtained in the same manner as in Example 1 except that the rate of increase in the temperature in the furnace to 450° C. was changed to 5° C./min. The results are shown in Table 4.

A carbonized film was obtained in the same manner as in Example 1 except that the rate of increase in the temperature in the furnace to 450° C. was changed to 10° C./min. The results are shown in Table 4.

Example 33

A carbonized film was obtained in the same manner as in Example 1 except that the container d was used as a container. The results are shown in Table 5.

Example 34

A carbonized film was obtained in the same manner as in Example 1 except that the container e was used as a container. The results are shown in Table 5.

TABLE 4

| | Raw Material Film | | | Decompression Conditions | | | |
| --- | --- | --- | --- | --- | --- | --- | --- |
| | | | | | Degree of Vacuum | Conditions after Decompression | | Presence |
| | Thickness μm | Length m | Width mm | Temperature | (Absolute Pressure) | Temperature | Flow Rate of Nitrogen | or Absence of Restraint |
| Example 1 | 50 | 50 | 500 | R.T.-450° C. | 0.04 kPa | 450° C.-1000° C. | 5.0 L/min | Absent |
| Example 28 | 50 | 50 | 500 | R.T.-450° C. | 0.04 kPa | 450° C.-1000° C. | 5.0 L/min | Absent |
| Example 29 | 50 | 50 | 500 | R.T.-450° C. | 0.04 kPa | 450° C.-1000° C. | 5.0 L/min | Absent |
| Example 30 | 50 | 50 | 500 | R.T.-450° C. | 0.04 kPa | 450° C.-1000° C. | 5.0 L/min | Absent |

| | Container | | | | | | Evaluations | | | | |
| --- | --- | --- | --- | --- | --- | --- | --- | --- | --- | --- | --- |
| | | Inner | | | | | | Fusion Bonding | | | |
| | Diameter of Core mm | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | Cracking | Waving |
| Example 1 | 100 | Present | 130 | 7.5 | 2.0 | Lateral | 1 | Outside | 0 | A | A | A |
| Example 28 | 100 | Present | 130 | 7.5 | 2.0 | Lateral | 2 | Outside | 0 | A | A | A |
| Example 29 | 100 | Present | 130 | 7.5 | 2.0 | Lateral | 5 | Outside | 3 | B | A | A |
| Example 30 | 100 | Present | 130 | 7.5 | 2.0 | Lateral | 10 | Outside | 10 | D | A | A |

As can be seen from the results shown in Table 4, the effect of inhibiting the occurrence of fusion bonding was enhanced by lowering the rate of temperature rise in a temperature range lower than the pyrolysis onset temperature. Loosening of a wound film gradually proceeds from the outer peripheral part to the inner side of a roll of the film, and therefore it takes a while to loosen the central part of the film roll. For this reason, it is considered that the occurrence of fusion bonding can be more effectively inhibited by lowering the rate of temperature rise in a temperature range lower than the pyrolysis onset temperature.

Example 31

A carbonized film was obtained in the same manner as in Example 1 except that the container b was used as a container. The results are shown in Table 5.

Example 32

A carbonized film was obtained in the same manner as in Example 1 except that the container c was used as a container. The results are shown in Table 5.

Example 35

A carbonized film was obtained in the same manner as in Example 1 except that the container f was used as a container. The results are shown in Table 5.

Example 36

A carbonized film was obtained in the same manner as in Example 1 except that the container b was used as a container and that nitrogen gas was not introduced into the furnace after the pressure in the furnace was returned to atmospheric pressure by introducing nitrogen into the furnace after the completion of decompression. The results are shown in Table 5.

Example 37

A carbonized film was obtained in the same manner as in Example 1 except that the container d was used as a container and that nitrogen gas was not introduced into the furnace after the pressure in the furnace was returned to atmospheric pressure by introducing nitrogen into the furnace after the completion of decompression. The results are shown in Table 5.

TABLE 5

| | Raw Material Film | | | Decompression Conditions | | Conditions after Decompression | | Presence |
| --- | --- | --- | --- | --- | --- | --- | --- | --- |
| | Thickness μm | Length m | Width mm | Temperature | Degree of Vacuum (Absolute Pressure) | Temperature | Flow Rate of Nitrogen | or Absence of Restraint |
| Example 31 | 50 | 50 | 500 | R.T.-450° C. | 0.04 kPa | 450° C.-1000° C. | 5.0 L/min | Absent |
| Example 1 | 50 | 50 | 500 | R.T.-450° C. | 0.04 kPa | 450° C.-1000° C. | 5.0 L/min | Absent |
| Example 32 | 50 | 50 | 500 | R.T.-450° C. | 0.04 kPa | 450° C.-1000° C. | 5.0 L/min | Absent |
| Example 33 | 50 | 50 | 500 | R.T.-450° C. | 0.04 kPa | 450° C.-1000° C. | 5.0 L/min | Absent |
| Example 34 | 50 | 50 | 500 | R.T.-450° C. | 0.04 kPa | 450° C.-1000° C. | 5.0 L/min | Absent |
| Example 35 | 50 | 50 | 500 | R.T.-450° C. | 0.04 kPa | 450° C.-1000° C. | 5.0 L/min | Absent |
| Example 36 | 50 | 50 | 500 | R.T.-450° C. | 0.04 kPa | 450° C.-1000° C. | — | Absent |
| Example 9 | 50 | 50 | 500 | R.T.-450° C. | 0.04 kPa | 450° C.-1000° C. | — | Absent |
| Example 37 | 50 | 50 | 500 | R.T.-450° C. | 0.04 kPa | 450° C.-1000° C. | — | Absent |

| | Container | | | | | | | Evaluations | | |
| --- | --- | --- | --- | --- | --- | --- | --- | --- | --- | --- |
| | | Inner | | | | | | Fusion Bonding | | |
| | Diameter of Core | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | Cracking | Waving |
| Example 31 | 100 | Present | 125 | 7.5 | 1.7 | Lateral | 1 | Outside | 10 | D | A | A |
| Example 1 | 100 | Present | 130 | 7.5 | 2.0 | Lateral | 1 | Outside | 0 | A | A | A |
| Example 32 | 100 | Present | 140 | 7.5 | 2.7 | Lateral | 1 | Outside | 0 | A | A | B |
| Example 33 | 100 | Present | 150 | 7.5 | 3.3 | Lateral | 1 | Outside | 0 | A | A | B |
| Example 34 | 100 | Present | 160 | 7.5 | 4.0 | Lateral | 1 | Outside | 0 | A | A | C |
| Example 35 | 100 | Present | 180 | 7.5 | 5.3 | Lateral | 1 | Outside | 0 | A | B | C |
| Example 36 | 100 | Present | 125 | 7.5 | 1.7 | Lateral | 1 | Outside | 14 | D | A | A |
| Example 9 | 100 | Present | 130 | 7.5 | 2.0 | Lateral | 1 | Outside | 5 | C | A | A |
| Example 37 | 100 | Present | 150 | 7.5 | 3.3 | Lateral | 1 | Outside | 3 | B | A | B |

As can be seen from the results shown in Table 5, the effect of inhibiting the occurrence of fusion bonding was enhanced by increasing a value (a/b) obtained by dividing a value (a), obtained by dividing a value obtained by subtracting the diameter of the core from the inner diameter of the external tube by 2, by the thickness (b) of a roll of the film. That is, the effect of inhibiting the occurrence of fusion bonding is enhanced by increasing the gap between the external tube and the core. According to the present invention, a wound film is loosened before the start of pyrolysis to inhibit the occurrence of fusion bonding, and therefore the thickness of a roll of the film becomes larger than the initial thickness (b) of the film roll by loosening the film. For this reason, it is considered that when the gap between the external tube and the core is small (Examples 31 and 36), there is no space for adequately loosening the entire film roll so that fusion bonding is likely to occur.

However, when the gap between the external tube and the core is too large (Examples 34 and 35), the degree of freedom of the film is increased due to excessive loosening of the wound film so that waving is likely to occur.

Example 38

A carbonized film was obtained in the same manner as in Example 1 except that the container a was placed vertically in the furnace (i.e., in such a manner that the circular plate 220 was placed as the bottom surface of the container a). The results are shown in Table 6.

Example 39

A carbonized film was obtained in the same manner as in Example 1 except that the end of the outermost layer of the polymer film wound around the core was fixed using a 10 mm commercially-available cellophane tape. The results are shown in Table 6.

TABLE 6

| | Raw Material Film | | | Decompression Conditions | | Conditions after Decompression | | Presence |
| --- | --- | --- | --- | --- | --- | --- | --- | --- |
| | Thickness μm | Length m | Width mm | Temperature | Degree of Vacuum (Absolute Pressure) | Temperature | Flow Rate of Nitrogen | or Absence of Restraint |
| Example 1 | 50 | 50 | 500 | R.T.-450° C. | 0.04 kPa | 450° C.-1000° C. | 5.0 L/min | Absent |
| Example 38 | 50 | 50 | 500 | R.T.-450° C. | 0.04 kPa | 450° C.-1000° C. | 5.0 L/min | Absent |
| Example 39 | 50 | 50 | 500 | R.T.-450° C. | 0.04 kPa | 450° C.-1000° C. | 5.0 L/min | Present |

TABLE 6-continued

| | Container | | | | | | | | Evaluations | | |
|---|---|---|---|---|---|---|---|---|---|---|---|
| | | | Inner | | | | | | Fusion Bonding | | |
| | Diameter of Core | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | Cracking | Waving |
| Example 1 | 100 | Present | 130 | 7.5 | 2.0 | Lateral | 1 | Outside | 0 | A | A | A |
| Example 38 | 100 | Present | 130 | 7.5 | 2.0 | Vertical | 1 | Outside | 10 | D | B | A |
| Example 39 | 100 | Present | 130 | 7.5 | 2.0 | Lateral | 1 | Outside | 10 | D | A | A |

As can be seen from a comparison between Examples 1 and 38, fusion bonding is less likely to occur when the container was laterally placed than when it was placed vertically. It is considered that when the container was placed vertically, the lower end of the film was in contact with the bottom surface of the container, and therefore loosening of the wound film during decompression was inhibited by friction so that fusion bonding occurred in many layers of the film.

In Example 39, the end of the outermost layer of the film was restrained by a cellophane tape, which inhibited loosening of the film so that fusion bonding occurred in many layers of the film. However, the cellophane tape was peeled off due to heating, and therefore fusion bonding did not occur in all the layers of the film.

Example 40

A carbonized film was obtained in the same manner as in Example 1 except that the polymer film was heated from the core side by directly electrically heating the core without heating the heater 500 provided outside. The results are shown in Table 7.

Example 41

A carbonized film was obtained in the same manner as in Example 1 except that the length of the polymer film was changed to 100 m and that the container e was used as a container. The results are shown in Table 7.

Example 42

A carbonized film was obtained in the same manner as in Example 1 except that the length of the polymer film was changed to 150 m and that the container f was used as a container. The results are shown in Table 7.

Example 43

A carbonized film was obtained in the same manner as in Example 1 except that the width of the polymer film was changed to 250 mm. The results are shown in Table 7.

Example 44

A carbonized film was obtained in the same manner as in Example 1 except that the polymer film was changed to a polyimide film with a thickness of 75 μm (manufactured by Kaneka Corporation under the trade name of APICAL 75AH). The results are shown in Table 7.

TABLE 7

| | Raw Material Film | | | Decompression Conditions | | Conditions after Decompression | | Presence or Absence of Restraint |
|---|---|---|---|---|---|---|---|---|
| | Thickness μm | Length m | Width mm | Temperature | Degree of Vacuum (Absolute Pressure) | Temperature | Flow Rate of Nitrogen | |
| Example 1 | 50 | 50 | 500 | R.T.-450° C. | 0.04 kPa | 450° C.-1000° C. | 5.0 L/min | Absent |
| Example 40 | 50 | 50 | 500 | R.T.-450° C. | 0.04 kPa | 450° C.-1000° C. | 5.0 L/min | Absent |
| Example 41 | 50 | 100 | 500 | R.T.-450° C. | 0.04 kPa | 450° C.-1000° C. | 5.0 L/min | Absent |
| Example 42 | 50 | 150 | 500 | R.T.-450° C. | 0.04 kPa | 450° C.-1000° C. | 5.0 L/min | Absent |
| Example 43 | 50 | 50 | 250 | R.T.-450° C. | 0.04 kPa | 450° C.-1000° C. | 5.0 L/min | Absent |
| Example 44 | 75 | 50 | 500 | R.T.-450° C. | 0.04 kPa | 450° C.-1000° C. | 5.0 L/min | Absent |

| | Container | | | | | | | | Evaluations | | |
|---|---|---|---|---|---|---|---|---|---|---|---|
| | | | Inner | | | | | | Fusion Bonding | | |
| | Diameter of Core | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | Cracking | Waving |
| Example 1 | 100 | Present | 130 | 7.5 | 2.0 | Lateral | 1 | Outside | 0 | A | A | A |
| Example 40 | 100 | Present | 130 | 7.5 | 2.0 | Lateral | 1 | Inner Core | 5 | C | B | A |
| Example 41 | 100 | Present | 160 | 14 | 2.1 | Lateral | 1 | Outside | 3 | B | A | A |
| Example 42 | 100 | Present | 180 | 20 | 2.0 | Lateral | 1 | Outside | 15 | D | A | A |
| Example 43 | 100 | Present | 130 | 7.5 | 2.0 | Lateral | 1 | Outside | 0 | A | A | A |
| Example 44 | 100 | Present | 150 | 11.5 | 2.2 | Lateral | 1 | Outside | 0 | A | A | A |

As can be seen from a comparison between Examples 1 and 40, fusion bonding was less likely to occur when a roll of the film was heated from outside. When the film roll is heated by heating the inner core, carbonization proceeds from the central part of the film roll, and therefore the polymer film near the core is carbonized while being subjected to the load of the outer peripheral part of the film roll. Since the polymer film is larger in weight than the carbonized film, it is considered that fusion bonding and cracking are likely to occur in the central part of the film roll subjected to the load of the outer peripheral part of the polymer film roll. As can be seen from the results of Examples 41 to 44, the use of the production method according to the present invention made it possible to obtain an excellent carbonized film even when the length, width, or thickness of the polymer film was increased.

Example 45

A carbonized film was obtained in the same manner as in Example 1 except that decompression was performed so that the pressure in the furnace was 100.3 kPa in terms of absolute pressure (−1 kPa in terms of relative pressure measured by a relative pressure meter) while nitrogen gas was introduced into the furnace during an increase in temperature in the furnace from 450° C. to 1000° C. The results are shown in Table 8.

Example 46

A carbonized film was obtained in the same manner as in Example 45 except that the pressure in the furnace during an increase in temperature in the furnace from 450° C. to 1000° C. was adjusted to 91.3 kPa in terms of absolute pressure (−10 kPa in terms of relative pressure measured by a relative pressure meter). The results are shown in Table 8.

Example 47

A carbonized film was obtained in the same manner as in Example 45 except that, during an increase in temperature in the furnace from 450° C. to 1000° C., the flow rate of nitrogen gas was changed to 1 L/min and the pressure in the furnace was adjusted to 91.3 kPa (−10 kPa in terms of relative pressure measured by a relative pressure meter). The results are shown in Table 8.

Example 48

A carbonized film was obtained in the same manner as in Example 45 except that the pressure in the furnace during an increase in temperature in the furnace from room temperature to 450° C. was changed to 50 kPa (absolute pressure). The results are shown in Table 8.

Example 49

A carbonized film was obtained in the same manner as in Example 45 except that the pressure in the furnace during an increase in temperature in the furnace from room temperature to 450° C. was changed to 50 kPa (absolute pressure) and that the pressure in the furnace during an increase in temperature in the furnace from 450° C. to 1000° C. was adjusted to 91.3 kPa in terms of absolute pressure (−10 kPa in terms of relative pressure measured by a relative pressure meter). The results are shown in Table 8.

Example 50

A carbonized film was obtained in the same manner as in Example 45 except that the pressure in the furnace during an increase in temperature in the furnace from room temperature to 450° C. was changed to 50 kPa (absolute pressure) and that, during an increase in temperature in the furnace from 450° C. to 1000° C., the flow rate of nitrogen gas was changed to 1 L/min and the pressure in the furnace was adjusted to 91.3 kPa in terms of absolute pressure (−10 kPa in terms of relative pressure measured by a relative pressure meter). The results are shown in Table 8.

Example 51

A carbonized film was obtained in the same manner as in Example 45 except that the pressure in the furnace during an increase in temperature in the furnace from room temperature to 450° C. was changed to 50 kPa (absolute pressure) and that, during an increase in temperature in the furnace from 450° C. to 1000° C., the pressure in the furnace was adjusted to 91.3 kPa in terms of absolute pressure (−10 kPa in terms of relative pressure measured by a relative pressure meter) without introducing nitrogen gas. It is to be noted that nitrogen gas was introduced at the time when the temperature in the furnace reached 450° C. to increase the pressure in the furnace from 50 kPa to 91.3 kPa. The results are shown in Table 8.

Example 52

A carbonized film was obtained in the same manner as in Example 45 except that the pressure in the furnace during an increase in temperature in the furnace from room temperature to 450° C. was changed to 50 kPa (absolute pressure) and that, during an increase in temperature in the furnace from 450° C. to 1000° C., the flow rate of nitrogen gas was changed to 1 L/min and the pressure in the furnace was adjusted to 61.3 kPa in terms of absolute pressure (−40 kPa in terms of relative pressure measured by a relative pressure meter). The results are shown in Table 8.

Example 53

A carbonized film was obtained in the same manner as in Example 45 except that the length of the polymer film was changed to 150 m and that the pressure in the furnace during an increase in temperature in the furnace from 450° C. to 1000° C. was adjusted to 91.3 kPa in terms of absolute pressure (−10 kPa in terms of relative pressure measured by a relative pressure meter). The results are shown in Table 8.

TABLE 8

| | Raw Material Film | | | Heat Treatment Conditions | | | | | | | Presence or Absence of Restraint Absent |
|---|---|---|---|---|---|---|---|---|---|---|---|
| | | | | First Step | | | Second Step | | | | |
| | Thickness μm | Length m | Width mm | Temperature | Degree of Vacuum (Absolute Pressure) | Flow Rate of Nitrogen | Temperature | Degree of Vacuum (Relative Pressure) | Degree of Vacuum (Absolute Pressure) | Flow Rate of Nitrogen | |
| Example 1 | 50 | 50 | 500 | R.T.-450° C. | 0.04 kPa | — | 450° C.-1000° C. | 0 kPa | 101.3 kPa | 5.0 L/min | Absent |
| Example 45 | 50 | 50 | 500 | R.T.-450° C. | 0.04 kPa | — | 450° C.-1000° C. | −1 kPa | 100.3 kPa | 5.0 L/min | Absent |
| Example 46 | 50 | 50 | 500 | R.T.-450° C. | 0.04 kPa | — | 450° C.-1000° C. | −10 kPa | 91.3 kPa | 5.0 L/min | Absent |
| Example 47 | 50 | 50 | 500 | R.T.-450° C. | 0.04 kPa | — | 450° C.-1000° C. | −10 kPa | 91.3 kPa | 1.0 L/min | Absent |
| Example 17 | 50 | 50 | 500 | R.T.-450° C. | 50 kPa | — | 450° C.-1000° C. | 0 kPa | 101.3 kPa | 5.0 L/min | Absent |
| Example 48 | 50 | 50 | 500 | R.T.-450° C. | 50 kPa | — | 450° C.-1000° C. | −1 kPa | 100.3 kPa | 5.0 L/min | Absent |

TABLE 8-continued

| | | | | | | | | | | | | |
|---|---|---|---|---|---|---|---|---|---|---|---|---|
| Example 49 | 50 | 50 | 500 | R.T.-450° C. | 50 kPa | — | 450° C.-1000° C. | −10 kPa | 91.3 kPa | 5.0 L/min | Absent |
| Example 50 | 50 | 50 | 500 | R.T.-450° C. | 50 kPa | — | 450° C.-1000° C. | −10 kPa | 91.3 kPa | 1.0 L/min | Absent |
| Example 51 | 50 | 50 | 500 | R.T.-450° C. | 50 kPa | — | 450° C.-1000° C. | −10 kPa | 91.3 kPa | — | Absent |
| Example 52 | 50 | 50 | 500 | R.T.-450° C. | 50 kPa | — | 450° C.-1000° C. | −40 kPa | 61.3 kPa | 1.0 L/min | Absent |
| Example 43 | 50 | 150 | 500 | R.T.-450° C. | 0.04 kPa | — | 450° C.-1000° C. | −0 kPa | 101.3 kPa | 5.0 L/min | Absent |
| Example 53 | 50 | 150 | 500 | R.T.-450° C. | 0.04 kPa | — | 450° C.-1000° C. | −10 kPa | 91.3 kPa | 5.0 L/min | Absent |

| | Container | | | | | | Evaluations | | | |
|---|---|---|---|---|---|---|---|---|---|---|
| | Inner | | | | | | Fusion Bonding | | | |
| | Diameter of Core mm | Presence or Absence of External Tube | Diameter of External Tube mm | Thickness of Film Roll mm | a/b | Orientation | Rate of Temperature Rise ° C./min | Heated Part | Number of Layers where Fusion Bonding Occurred | Cracking | Waving |
| Example 1 | 100 | Present | 130 | 7.5 | 2.0 | Lateral | 1 | Outside | 0 | A | A | A |
| Example 45 | 100 | Present | 130 | 7.5 | 2.0 | Lateral | 1 | Outside | 0 | A | A | A |
| Example 46 | 100 | Present | 130 | 7.5 | 2.0 | Lateral | 1 | Outside | 0 | A | A | A |
| Example 47 | 100 | Present | 130 | 7.5 | 2.0 | Lateral | 1 | Outside | 0 | A | A | A |
| Example 17 | 100 | Present | 130 | 7.5 | 2.0 | Lateral | 1 | Outside | 8 | C | A | A |
| Example 48 | 100 | Present | 130 | 7.5 | 2.0 | Lateral | 1 | Outside | 6 | C | A | A |
| Example 49 | 100 | Present | 130 | 7.5 | 2.0 | Lateral | 1 | Outside | 3 | B | A | A |
| Example 50 | 100 | Present | 130 | 7.5 | 2.0 | Lateral | 1 | Outside | 3 | B | A | A |
| Example 51 | 100 | Present | 130 | 7.5 | 2.0 | Lateral | 1 | Outside | 6 | C | A | A |
| Example 52 | 100 | Present | 130 | 7.5 | 2.0 | Lateral | 1 | Outside | 3 | B | B | A |
| Example 43 | 100 | Present | 180 | 20 | 2.0 | Lateral | 1 | Outside | 15 | D | A | A |
| Example 53 | 100 | Present | 180 | 20 | 2.0 | Lateral | 1 | Outside | 5 | C | A | A |

As can be seen from the results shown in Table 8, the effect of inhibiting the occurrence of fusion bonding was enhanced by slightly reducing the pressure in the furnace in a temperature range of the pyrolysis onset temperature or higher after decompression was performed in a temperature range lower than the pyrolysis onset temperature. It is considered that the reason for this is that a decomposition gas retained between the layers of the film was sucked out by decompression, which prevented the decomposition gas from being retained between the layers of the film. As can be seen from a comparison between Examples 50 and 51, the effect of inhibiting the occurrence of fusion bonding was further enhanced by performing the above-described nitrogen gas introduction during the second decompression. As can be seen from a comparison between Examples 48 and 49, the effect of inhibiting the occurrence of fusion bonding was enhanced by lowering the degree of vacuum during the second decompression. However, as can be seen from a comparison between Examples 51 and 52, a greater load was applied to the carbonized film by decompression by increasing the degree of vacuum during the second decompression so that cracking occurred in some degree.

As can be seen from a comparison between Examples 49 and 50, the effects obtained by introducing nitrogen gas at a flow rate of 5 L/min during the second decompression were the same as those obtained by introducing nitrogen gas at a flow rate of 1 L/min.

Example 61

A carbonized film was obtained in the same manner as in Example 1 except that, as shown in FIG. 9, diselectrification during rewinding was omitted and that the winding speed was changed to 1 m/min and the winding-start tension (Ps) was changed to 40 N/min and the winding-end tension (Pe) was adjusted so that the ratio of Pe/Ps was 1. That is, in this example, the polymer film was wound at a tension of 40 N/m from start to end of winding. The results are shown in Table 9.

Example 62

A carbonized film was obtained in the same manner as in Example 61 except that the winding-start tension (Ps) was changed to 100 N/m. That is, in this example, the polymer film was wound at a tension of 100 N/m from start to end of winding. The results are shown in Table 9.

Example 63

A carbonized film was obtained in the same manner as in Example 61 except that the winding-start tension (Ps) was changed to 200 N/m. That is, in this example, the polymer film was wound at a tension of 200 N/m from start to end of winding. The results are shown in Table 9.

Example 64

A carbonized film was obtained in the same manner as in Example 61 except that the winding-start tension (Ps) was changed to 400 N/m. That is, in this example, the polymer film was wound at a tension of 400 N/m from start to end of winding. The results are shown in Table 9.

Example 65

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the winding speed was changed to 10 m/min. The results are shown in Table 9.

Example 66

A carbonized film was obtained in the same manner as in Example 62 except that, as shown in FIG. 7, the polymer film was rewound while both surfaces of the polymer film were diselectrified so that the amount of charge in each of the surfaces of the wound polymer film was 1 kV and that the winding speed was changed to 10 m/min. The results are shown in Table 9.

Example 67

A carbonized film was obtained in the same manner as in Example 63 except that, as shown in FIG. 7, the polymer film was rewound while both surfaces of the polymer film were diselectrified so that the amount of charge in each of the surfaces of the wound polymer film was 1 kV and that the winding speed was changed to 10 m/min. The results are shown in Table 9.

reason is that the amount of gas trapped in the film roll was controlled by winding the polymer film under tension so that the film was prevented from being excessively loosened by decompression. As for fusion bonding, it is considered that the reason why the occurrence of fusion bonding was inhibited is that the amount of gas trapped in the film roll was reduced but the repulsive force of the film was increased by changing the winding tension from 40 N/m to 100 N/m. On the other hand, the occurrence of fusion bonding was slightly increased when the winding tension was changed from 200 N/m to 400 N/m. It is considered that the reason for this is that the amount of gas trapped in the film roll was excessively

TABLE 9

| | Raw Material Film | | | Rewinding | | | | | | | |
|---|---|---|---|---|---|---|---|---|---|---|---|
| | | | | Amount of Charge (kV) | | Winding Tension | | Nip Pressure | Winding Speed | | Decompression in Temperature Range Lower than Pyrolysis Onset Temperature |
| | Thickness μm | Length m | Width mm | Outside | Inside | (Ps) N/m | Pe/Ps | N/m | m/min | Restraint | |
| Example 61 | 50 | 50 | 500 | 25 | 25 | 40 | 1 | 0 | 1 | Absent | Present |
| Example 62 | 50 | 50 | 500 | 25 | 25 | 100 | 1 | 0 | 1 | Absent | Present |
| Example 63 | 50 | 50 | 500 | 25 | 25 | 200 | 1 | 0 | 1 | Absent | Present |
| Example 64 | 50 | 50 | 500 | 25 | 25 | 400 | 1 | 0 | 1 | Absent | Present |
| Example 65 | 50 | 50 | 500 | 1 | 1 | 40 | 1 | 0 | 10 | Absent | Present |
| Example 66 | 50 | 50 | 500 | 1 | 1 | 100 | 1 | 0 | 10 | Absent | Present |
| Example 67 | 50 | 50 | 500 | 1 | 1 | 200 | 1 | 0 | 10 | Absent | Present |

| | Decompression Conditions | | Conditions after Decompression | | | Container | |
|---|---|---|---|---|---|---|---|
| | Temperature | Degree of Vacuum | Temperature | Flow Rate of Nitrogen | Diameter of Core mm | Presence or Absence of External Tube | Inner Diameter of External Tube mm |
| Example 61 | R.T.-450° C. | 0.04 kPa | 450° C.-1000° C. | 5.0 L/min | 100 | Present | 130 |
| Example 62 | R.T.-450° C. | 0.04 kPa | 450° C.-1000° C. | 5.0 L/min | 100 | Present | 130 |
| Example 63 | R.T.-450° C. | 0.04 kPa | 450° C.-1000° C. | 5.0 L/min | 100 | Present | 130 |
| Example 64 | R.T.-450° C. | 0.04 kPa | 450° C.-1000° C. | 5.0 L/min | 100 | Present | 130 |
| Example 65 | R.T.-450° C. | 0.04 kPa | 450° C.-1000° C. | 5.0 L/min | 100 | Present | 130 |
| Example 66 | R.T.-450° C. | 0.04 kPa | 450° C.-1000° C. | 5.0 L/min | 100 | Present | 130 |
| Example 67 | R.T.-450° C. | 0.04 kPa | 450° C.-1000° C. | 5.0 L/min | 100 | Present | 130 |

| | Container | | | Rate of Temperature Rise to 450° C. ° C./min | Evaluations | | |
|---|---|---|---|---|---|---|---|
| | Thickness of Film Roll mm | a/b | Orientation | | Fusion Bonding Number of Layers where Fusion Bonding Occurred | Cracking | Waving |
| Example 61 | 7.5 | 2.0 | Lateral | 1 | 15 | D | A | B |
| Example 62 | 7.5 | 2.0 | Lateral | 1 | 10 | D | A | A |
| Example 63 | 7.5 | 2.0 | Lateral | 1 | 10 | D | A | A |
| Example 64 | 7.5 | 2.0 | Lateral | 1 | 13 | D | A | A |
| Example 65 | 7.5 | 2.0 | Lateral | 1 | 0 | A | A | B |
| Example 66 | 7.5 | 2.0 | Lateral | 1 | 0 | A | A | A |
| Example 67 | 7.5 | 2.0 | Lateral | 1 | 0 | A | A | A |

As can be seen from a comparison among Examples 61 to 64, the occurrence of waving in the produced carbonized film was inhibited by increasing the winding tension applied to the polymer film during winding around the core. It is considered that the reason for this is that stress distribution along the radial and tangential directions of a roll of the polymer film was made more uniform by winding the polymer film under tension so that the entire film was shrunk uniformly by carbonization. In addition to that, it is considered that another reason is that the amount of gas trapped in the film roll was reduced so that loosening of the wound film was less likely to occur in the central part of the film roll.

Example 69

A carbonized film was obtained in the same manner as in Example 61 except that, as shown in FIG. 8, the polymer film was rewound while the nip roller 350 was brought into contact with the film so that a pressure of 50 N/m was applied to the core 100 side. The results are shown in Table 10.

Example 70

A carbonized film was obtained in the same manner as in Example 61 except that, as shown in FIG. 8, the polymer film was rewound while the nip roller 350 was brought into contact with the film so that a pressure of 20 N/m was applied to the core 100 side. The results are shown in Table 10.

Example 71

A carbonized film was obtained in the same manner as in Example 61 except that the polymer film was rewound while the winding tension was reduced from a winding-start tension (Ps) of 40 N/m at a constant change rate so that the ratio of Pe/Ps was 0.8. The results are shown in Table 10.

Example 72

A carbonized film was obtained in the same manner as in Example 61 except that the polymer film was rewound while the winding tension was increased from a winding-start tension (Ps) of 40 N/m at a constant change rate so that the ratio of Pe/Ps was 1.1. The results are shown in Table 10.

Example 73

A carbonized film was obtained in the same manner as in Example 61 except that the polymer film was rewound while the winding tension was increased from a winding-start tension (Ps) of 40 N/m at a constant change rate so that the ratio of Pe/Ps was 1.3. The results are shown in Table 10.

TABLE 10

| | Raw Material Film | | | Amount of Charge (kV) | | Rewinding | | | | | Decompression in Temperature Range Lower than Pyrolysis Onset Temperature |
|---|---|---|---|---|---|---|---|---|---|---|---|
| | | | | | | Winding Tension | | Nip Pressure | Winding Speed | | |
| | Thickness μm | Length m | Width mm | Outside | Inside | (Ps) N/m | Pe/Ps | N/m | m/min | Restraint | |
| Example 69 | 50 | 50 | 500 | 25 | 25 | 40 | 1 | 50 | 1 | Absent | Present |
| Example 70 | 50 | 50 | 500 | 25 | 25 | 40 | 1 | 20 | 1 | Absent | Present |
| Example 61 | 50 | 50 | 500 | 25 | 25 | 40 | 1 | 0 | 1 | Absent | Present |
| Example 71 | 50 | 50 | 500 | 25 | 25 | 40 | 0.8 | 0 | 1 | Absent | Present |
| Example 72 | 50 | 50 | 500 | 25 | 25 | 40 | 1.1 | 0 | 1 | Absent | Present |
| Example 73 | 50 | 50 | 500 | 25 | 25 | 40 | 1.3 | 0 | 1 | Absent | Present |

| | Decompression Conditions | | Conditions after Decompression | | Container | | |
|---|---|---|---|---|---|---|---|
| | Temperature | Degree of Vacuum | Temperature | Flow Rate of Nitrogen | Diameter of Core mm | Presence or Absence of External Tube | Inner Diameter of External Tube mm |
| Example 69 | R.T.-450° C. | 0.04 kPa | 450° C.-1000° C. | 5.0 L/min | 100 | Present | 130 |
| Example 70 | R.T.-450° C. | 0.04 kPa | 450° C.-1000° C. | 5.0 L/min | 100 | Present | 130 |
| Example 61 | R.T.-450° C. | 0.04 kPa | 450° C.-1000° C. | 5.0 L/min | 100 | Present | 130 |
| Example 71 | R.T.-450° C. | 0.04 kPa | 450° C.-1000° C. | 5.0 L/min | 100 | Present | 130 |
| Example 72 | R.T.-450° C. | 0.04 kPa | 450° C.-1000° C. | 5.0 L/min | 100 | Present | 130 |
| Example 73 | R.T.-450° C. | 0.04 kPa | 450° C.-1000° C. | 5.0 L/min | 100 | Present | 130 |

| | Container | | Rate of Temperature Rise to 450° C. ° C./min | Evaluations | | |
|---|---|---|---|---|---|---|
| | Thickness of Film Roll mm | Orientation a/b | | Fusion Bonding Number of Layers where Fusion Bonding Occurred | Cracking | Waving |
| Example 69 | 7.5 | 2.0 Lateral | 1 | 18 D | A | B |
| Example 70 | 7.5 | 2.0 Lateral | 1 | 15 D | A | B |
| Example 61 | 7.5 | 2.0 Lateral | 1 | 15 D | A | B |
| Example 71 | 7.5 | 2.0 Lateral | 1 | 15 D | A | B |
| Example 72 | 7.5 | 2.0 Lateral | 1 | 13 D | A | B |
| Example 73 | 7.5 | 2.0 Lateral | 1 | 10 D | A | A |

As can be seen from the results of Examples 61, 69, and 70, the occurrence of fusion bonding was more effectively inhibited when the nip pressure applied to the polymer film during rewinding was lower. It is considered that the reason for this is that a larger amount of gas was trapped between the layers of the film by lowering the nip pressure. As can be seen from a comparison among Examples 61 and 71 to 73, the occurrence of fusion bonding was more effectively inhibited when the winding-end tension Pe was larger than the winding-start tension Ps. It is considered that the reason for this is that since loosening of a polymer film wound around a core starts from the outer peripheral part of a roll of the film, loosening of the wound film is more likely to occur by increasing the repulsive force of the film on the outer peripheral side of the film roll, but on the other hand, since loosening of the wound film is less likely occur in the central part of the film roll due to high resistance from the outer film, the occurrence of fusion bonding is reduced by winding the film at a lower tension so that a larger amount of gas can be trapped between the layers of the film.

Example 74

A carbonized film was obtained in the same manner as in Example 61 except that the winding-start tension (Ps) was changed to 100 N/m and the polymer film was rewound at a tension of 100 N/m from start to end of rewinding so that the ratio of Pe/Ps was 1 and that the winding speed was changed to 3 m/min. The results are shown in Table 11.

Example 75

A carbonized film was obtained in the same manner as in Example 61 except that the winding-start tension (Ps) was changed to 100 N/m and the polymer film was rewound at a tension of 100 N/m from start to end of rewinding so that the ratio of Pe/Ps was 1 and that the winding speed was changed to 10 m/min. The results are shown in Table 11.

Example 76

A carbonized film was obtained in the same manner as in Example 61 except that the winding-start tension (Ps) was changed to 100 N/m and the polymer film was rewound at a tension of 100 N/m from start to end of rewinding so that the ratio of Pe/Ps was 1 and that the winding speed was changed to 20 m/min. The results are shown in Table 11.

Example 77

A carbonized film was obtained in the same manner as in Example 61 except that the winding-start tension (Ps) was changed to 100 N/m and the polymer film was rewound at a tension of 100 N/m from start to end of rewinding so that the ratio of Pe/Ps was 1 and that the winding speed was changed to 30 m/min. The results are shown in Table 11.

Example 78

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the winding tension was changed to 100 N/m. The results are shown in Table 11.

Example 79

A carbonized film was obtained in the same manner as in Example 1 except that, as shown in FIG. 7, the polymer film was rewound while both surfaces of the polymer film were diselectrified so that the amount of charge in each of the surfaces of the wound polymer film was 1 kV and that the winding tension was changed to 100 N/m and the winding speed was changed to 3 m/min. The results are shown in Table 3.

Example 80

A carbonized film was obtained in the same manner as in Example 1 except that, as shown in FIG. 7, the polymer film was rewound while both surfaces of the polymer film were diselectrified so that the amount of charge in each of the surfaces of the wound polymer film was 1 kV and that the winding tension was changed to 100 N/m and the winding speed was changed to 30 m/min. The results are shown in Table 3.

Example 81

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the length of the polymer film was changed to 150 m, the winding tension was changed to 100 N/m, and the winding speed was changed to 10 m/min. The results are shown in Table 11.

Example 82

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the length of the polymer film was changed to 150 m, the winding tension was changed to 100 N/m, and the winding speed was changed to 30 m/min. The results are shown in Table 11.

TABLE 11

| | Raw Material Film | | | Amount of Charge (kV) | | Rewinding Winding Tension (Ps) | | Nip Pressure | Winding Speed | Restraint | Decompression in Temperature Range Lower than Pyrolysis Onset Temperature |
|---|---|---|---|---|---|---|---|---|---|---|---|
| | Thickness μm | Length m | Width mm | Outside | Inside | N/m | Pe/Ps | N/m | m/min | | |
| Example 62 | 50 | 50 | 500 | 25 | 25 | 100 | 1 | 0 | 1 | Absent | Present |
| Example 74 | 50 | 50 | 500 | 25 | 25 | 100 | 1 | 0 | 3 | Absent | Present |

TABLE 11-continued

| | | | | | | | | | | | |
|---|---|---|---|---|---|---|---|---|---|---|---|
| Example 75 | 50 | 50 | 500 | 25 | 25 | 100 | 1 | 0 | 10 | Absent | Present |
| Example 76 | 50 | 50 | 500 | 25 | 25 | 100 | 1 | 0 | 20 | Absent | Present |
| Example 77 | 50 | 50 | 500 | 25 | 25 | 100 | 1 | 0 | 30 | Absent | Present |
| Example 78 | 50 | 50 | 500 | 1 | 1 | 100 | 1 | 0 | 1 | Absent | Present |
| Example 79 | 50 | 50 | 500 | 1 | 1 | 100 | 1 | 0 | 3 | Absent | Present |
| Example 66 | 50 | 50 | 500 | 1 | 1 | 100 | 1 | 0 | 10 | Absent | Present |
| Example 80 | 50 | 50 | 500 | 1 | 1 | 100 | 1 | 0 | 30 | Absent | Present |
| Example 81 | 50 | 150 | 500 | 1 | 1 | 100 | 1 | 0 | 10 | Absent | Present |
| Example 82 | 50 | 150 | 500 | 1 | 1 | 100 | 1 | 0 | 30 | Absent | Present |

| | Decompression Conditions | | Conditions after Decompression | | | Container | |
|---|---|---|---|---|---|---|---|
| | Temperature | Degree of Vacuum | Temperature | Flow Rate of Nitrogen | Diameter of Core mm | Presence or Absence of External Tube | Inner Diameter of External Tube mm |
| Example 62 | R.T.-450° C. | 0.04 kPa | 450° C.-1000° C. | 5.0 L/min | 100 | Present | 130 |
| Example 74 | R.T.-450° C. | 0.04 kPa | 450° C.-1000° C. | 5.0 L/min | 100 | Present | 130 |
| Example 75 | R.T.-450° C. | 0.04 kPa | 450° C.-1000° C. | 5.0 L/min | 100 | Present | 130 |
| Example 76 | R.T.-450° C. | 0.04 kPa | 450° C.-1000° C. | 5.0 L/min | 100 | Present | 130 |
| Example 77 | R.T.-450° C. | 0.04 kPa | 450° C.-1000° C. | 5.0 L/min | 100 | Present | 130 |
| Example 78 | R.T.-450° C. | 0.04 kPa | 450° C.-1000° C. | 5.0 L/min | 100 | Present | 130 |
| Example 79 | R.T.-450° C. | 0.04 kPa | 450° C.-1000° C. | 5.0 L/min | 100 | Present | 130 |
| Example 66 | R.T.-450° C. | 0.04 kPa | 450° C.-1000° C. | 5.0 L/min | 100 | Present | 130 |
| Example 80 | R.T.-450° C. | 0.04 kPa | 450° C.-1000° C. | 5.0 L/min | 100 | Present | 130 |
| Example 81 | R.T.-450° C. | 0.04 kPa | 450° C.-1000° C. | 5.0 L/min | 100 | Present | 130 |
| Example 82 | R.T.-450° C. | 0.04 kPa | 450° C.-1000° C. | 5.0 L/min | 100 | Present | 130 |

| | Container | | | Rate of | Fusion Bonding | Evaluations | | |
|---|---|---|---|---|---|---|---|---|
| | Thickness of Film Roll mm | a/b | Orientation | Temperature Rise to 450° C. ° C./min | Number of Layers where Fusion Bonding Occurred | | Cracking | Waving |
| Example 62 | 7.5 | 2.0 | Lateral | 1 | 10 | D | A | A |
| Example 74 | 7.5 | 2.0 | Lateral | 1 | 8 | C | A | A |
| Example 75 | 7.5 | 2.0 | Lateral | 1 | 5 | C | A | A |
| Example 76 | 7.5 | 2.0 | Lateral | 1 | 5 | C | A | A |
| Example 77 | 7.5 | 2.0 | Lateral | 1 | 3 | B | A | A |
| Example 78 | 7.5 | 2.0 | Lateral | 1 | 3 | B | A | A |
| Example 79 | 7.5 | 2.0 | Lateral | 1 | 0 | A | A | A |
| Example 66 | 7.5 | 2.0 | Lateral | 1 | 0 | A | A | A |
| Example 80 | 7.5 | 2.0 | Lateral | 1 | 0 | A | A | B |
| Example 81 | 7.5 | 2.0 | Lateral | 1 | 15 | D | A | A |
| Example 82 | 7.5 | 2.0 | Lateral | 1 | 10 | D | A | A |

As can be seen from a comparison among Examples 62 and 74 to 77, the occurrence of fusion bonding was inhibited by increasing the winding speed during winding of the polymer film around the core. It is considered that the reason for this is that the amount of gas trapped between the layers of the film was increased by increasing the winding speed. As can be seen from a comparison between Examples 81 and 82, the occurrence of fusion bonding was reduced by increasing the winding speed even when the length of the polymer film was increased. As can be seen from a comparison among Examples 78 to 80, the occurrence of fusion bonding was reduced by increasing the winding speed even when the amount of charge in the polymer film was as low as 1 kV. However, when the amount of charge was set to 1 kV, the slipperiness of the polymer film was improved and the wound film was more likely to be loosened. Therefore, the polymer film was excessively loosened at a winding speed of 30 m/min and the degree of freedom of the film was increased so that waving occurred in some degree.

Example 83

A carbonized film was obtained in the same manner as in Example 61 except that, as shown in FIG. 7, the polymer film was rewound while both surfaces of the polymer film were dielectrified so that the amount of charge in each of the surfaces of the wound polymer film was 15 kV and that the winding tension was changed to 100 N/m. The results are shown in Table 12.

Example 84

A carbonized film was obtained in the same manner as in Example 61 except that, as shown in FIG. 7, the polymer film was rewound while both surfaces of the polymer film were dielectrified so that the amount of charge in each of the surfaces of the wound polymer film was 8 kV and that the winding tension was changed to 100 N/m. The results are shown in Table 12.

Example 85

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 3 kV and that the winding tension was changed to 100 N/m. The results are shown in Table 12.

Example 86

A carbonized film was obtained in the same manner as in Example 61 except that, as shown in FIG. 3, the polymer film was rewound while one of the surfaces of the polymer film was diselectrified so that the amount of charge in the one of the surfaces of the wound polymer film was 1 kV and the amount of charge in the other surface of the wound polymer film was 25 kV and that the winding tension was changed to 100 N/m. The results are shown in Table 12.

Example 87

A carbonized film was obtained in the same manner as in Example 61 except that, as shown in FIG. 7, the polymer film was rewound while both surfaces of the polymer film were diselectrified so that the amount of charge in one of the surfaces of the wound polymer film was 1 kV and the amount of charge in the other surface of the wound polymer film was 8 kV and that the winding tension was changed to 100 N/m. The results are shown in Table 12.

Example 88

A carbonized film was obtained in the same manner as in Example 61 except that, as shown in FIG. 7, the polymer film was rewound while both surfaces of the polymer film were diselectrified so that the amount of charge in one of the surfaces of the wound polymer film was 1 kV and the amount of charge in the other surface of the wound polymer film was 3 kV and that the winding tension was changed to 100 N/m. The results are shown in Table 12.

Example 89

A carbonized film was obtained in the same manner as in Example 61 except that, as shown in FIG. 7, the polymer film was rewound while both surfaces of the polymer film were diselectrified so that the amount of charge in one of the surfaces of the wound polymer film was 1 kV and the amount of charge in the other surface of the wound polymer film was 15 kV and that the winding tension was changed to 100 N/m and the winding speed was changed to 30 m/min. The results are shown in Table 12.

Example 90

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 8 kV and that the winding tension was changed to 100 N/m and the winding speed was changed to 30 m/min. The results are shown in Table 12.

Example 91

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 15 kV and that the winding tension was changed to 100 N/m and the winding speed was changed to 30 m/min. The results are shown in Table 12.

Example 92

A carbonized film was obtained in the same manner as in Example 61 except that, as shown in FIG. 7, the polymer film was rewound while both surfaces of the polymer film were diselectrified so that the amount of charge in one of the surfaces of the wound polymer film was 1 kV and the amount of charge in the other surface of the wound polymer film was 15 kV and that the winding tension was changed to 100 N/m and the winding speed was changed to 10 m/min. The results are shown in Table 12.

Example 93

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 15 kV and that the winding tension was changed to 100 N/m and the winding speed was changed to 10 m/min. The results are shown in Table 12.

Example 101

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that, as shown in FIG. 8, the nip roller 350 was brought into contact with the polymer film while a pressure of 50 N/m was applied to the core 100 side during the rewinding of the polymer film, and that the winding tension was changed to 100 N/m and the winding speed was changed to 10 m/min. The results are shown in Table 12.

Example 102

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 15 kV and that the winding tension was increased from a winding-start tension (Ps) of 100 N/m at a certain change rate during rewinding of the polymer film so that the ratio of Pe/Ps was 1.3 and that the winding speed was changed to 10 m/min. The results are shown in Table 12.

TABLE 12

| | Raw Material Film | | | Rewinding | | | | | | | Decompression in Temperature Range |
|---|---|---|---|---|---|---|---|---|---|---|---|
| | | | | Amount of Charge (kV) | | Winding Tension (Ps) | Nip Pressure | Winding Speed | | | Lower than Pyrolysis |
| | Thickness μm | Length m | Width mm | Outside | Inside | N/m | Pe/Ps | N/m | m/min | Restraint | Onset Temperature |
| Example 62 | 50 | 50 | 500 | 25 | 25 | 100 | 1 | 0 | 1 | Absent | Present |
| Example 72 | 50 | 50 | 500 | 25 | 25 | 40 | 1.1 | 0 | 1 | Absent | Present |
| Example 73 | 50 | 50 | 500 | 25 | 25 | 40 | 1.3 | 0 | 1 | Absent | Present |
| Example 83 | 50 | 50 | 500 | 15 | 15 | 100 | 1 | 0 | 1 | Absent | Present |
| Example 84 | 50 | 50 | 500 | 8 | 8 | 100 | 1 | 0 | 1 | Absent | Present |
| Example 85 | 50 | 50 | 500 | 3 | 3 | 100 | 1 | 0 | 1 | Absent | Present |
| Example 86 | 50 | 50 | 500 | 25 | 1 | 100 | 1 | 0 | 1 | Absent | Present |
| Example 87 | 50 | 50 | 500 | 8 | 1 | 100 | 1 | 0 | 1 | Absent | Present |
| Example 88 | 50 | 50 | 500 | 3 | 1 | 100 | 1 | 0 | 1 | Absent | Present |
| Example 78 | 50 | 50 | 500 | 1 | 1 | 100 | 1 | 0 | 1 | Absent | Present |
| Example 80 | 50 | 50 | 500 | 1 | 1 | 100 | 1 | 0 | 30 | Absent | Present |
| Example 89 | 50 | 50 | 500 | 15 | 1 | 100 | 1 | 0 | 30 | Absent | Present |
| Example 90 | 50 | 50 | 500 | 8 | 8 | 100 | 1 | 0 | 30 | Absent | Present |
| Example 91 | 50 | 50 | 500 | 15 | 15 | 100 | 1 | 0 | 30 | Absent | Present |
| Example 66 | 50 | 50 | 500 | 1 | 1 | 100 | 1 | 0 | 10 | Absent | Present |
| Example 92 | 50 | 50 | 500 | 15 | 1 | 100 | 1 | 0 | 10 | Absent | Present |
| Example 93 | 50 | 50 | 500 | 15 | 15 | 100 | 1 | 0 | 10 | Absent | Present |
| Example 101 | 50 | 50 | 500 | 1 | 1 | 100 | 1 | 50 | 10 | Absent | Present |
| Example 102 | 50 | 50 | 500 | 15 | 15 | 100 | 1.3 | 0 | 10 | Absent | Present |

| | Decompression Conditions | | Conditions after Decompression | | Container | | Inner Diameter of External Tube mm |
|---|---|---|---|---|---|---|---|
| | Temperature | Degree of Vacuum | Temperature | Flow Rate of Nitrogen | Diameter of Core mm | Presence or Absence of External Tube | |
| Example 62 | R.T.-450° C. | 0.04 kPa | 450° C.-1000° C. | 5.0 L/min | 100 | Present | 130 |
| Example 72 | R.T.-450° C. | 0.04 kPa | 450° C.-1000° C. | 5.0 L/min | 100 | Present | 130 |
| Example 73 | R.T.-450° C. | 0.04 kPa | 450° C.-1000° C. | 5.0 L/min | 100 | Present | 130 |
| Example 83 | R.T.-450° C. | 0.04 kPa | 450° C.-1000° C. | 5.0 L/min | 100 | Present | 130 |
| Example 84 | R.T.-450° C. | 0.04 kPa | 450° C.-1000° C. | 5.0 L/min | 100 | Present | 130 |
| Example 85 | R.T.-450° C. | 0.04 kPa | 450° C.-1000° C. | 5.0 L/min | 100 | Present | 130 |
| Example 86 | R.T.-450° C. | 0.04 kPa | 450° C.-1000° C. | 5.0 L/min | 100 | Present | 130 |
| Example 87 | R.T.-450° C. | 0.04 kPa | 450° C.-1000° C. | 5.0 L/min | 100 | Present | 130 |
| Example 88 | R.T.-450° C. | 0.04 kPa | 450° C.-1000° C. | 5.0 L/min | 100 | Present | 130 |
| Example 78 | R.T.-450° C. | 0.04 kPa | 450° C.-1000° C. | 5.0 L/min | 100 | Present | 130 |
| Example 80 | R.T.-450° C. | 0.04 kPa | 450° C.-1000° C. | 5.0 L/min | 100 | Present | 130 |
| Example 89 | R.T.-450° C. | 0.04 kPa | 450° C.-1000° C. | 5.0 L/min | 100 | Present | 130 |
| Example 90 | R.T.-450° C. | 0.04 kPa | 450° C.-1000° C. | 5.0 L/min | 100 | Present | 130 |
| Example 91 | R.T.-450° C. | 0.04 kPa | 450° C.-1000° C. | 5.0 L/min | 100 | Present | 130 |
| Example 66 | R.T.-450° C. | 0.04 kPa | 450° C.-1000° C. | 5.0 L/min | 100 | Present | 130 |
| Example 92 | R.T.-450° C. | 0.04 kPa | 450° C.-1000° C. | 5.0 L/min | 100 | Present | 130 |
| Example 93 | R.T.-450° C. | 0.04 kPa | 450° C.-1000° C. | 5.0 L/min | 100 | Present | 130 |
| Example 101 | R.T.-450° C. | 0.04 kPa | 450° C.-1000° C. | 5.0 L/min | 100 | Present | 130 |
| Example 102 | R.T.-450° C. | 0.04 kPa | 450° C.-1000° C. | 5.0 L/min | 100 | Present | 130 |

| | Container | | | Rate of | Evaluations | | | |
|---|---|---|---|---|---|---|---|---|
| | Thickness of Film Roll mm | a/b | Orientation | Temperature Rise to 450° C. ° C./min | Fusion Bonding Number of Layers where Fusion Bonding Occurred | | Cracking | Waving |
| Example 62 | 7.5 | 2.0 | Lateral | 1 | 10 | D | A | A |
| Example 72 | 7.5 | 2.0 | Lateral | 1 | 13 | D | A | B |
| Example 73 | 7.5 | 2.0 | Lateral | 1 | 10 | D | A | A |
| Example 83 | 7.5 | 2.0 | Lateral | 1 | 6 | C | A | A |
| Example 84 | 7.5 | 2.0 | Lateral | 1 | 5 | C | A | A |
| Example 85 | 7.5 | 2.0 | Lateral | 1 | 3 | B | A | A |
| Example 86 | 7.5 | 2.0 | Lateral | 1 | 6 | C | A | A |
| Example 87 | 7.5 | 2.0 | Lateral | 1 | 3 | B | A | A |
| Example 88 | 7.5 | 2.0 | Lateral | 1 | 3 | B | A | B |
| Example 78 | 7.5 | 2.0 | Lateral | 1 | 3 | B | A | A |
| Example 80 | 7.5 | 2.0 | Lateral | 1 | 0 | A | A | B |
| Example 89 | 7.5 | 2.0 | Lateral | 1 | 0 | A | A | A |
| Example 90 | 7.5 | 2.0 | Lateral | 1 | 0 | A | A | A |

TABLE 12-continued

|  | | | | | | | | |
|---|---|---|---|---|---|---|---|---|
| Example 91 | 7.5 | 2.0 | Lateral | 1 | 3 | B | A | A |
| Example 66 | 7.5 | 2.0 | Lateral | 1 | 0 | A | A | A |
| Example 92 | 7.5 | 2.0 | Lateral | 1 | 0 | A | A | A |
| Example 93 | 7.5 | 2.0 | Lateral | 1 | 5 | C | A | A |
| Example 101 | 7.5 | 2.0 | Lateral | 1 | 5 | C | A | A |
| Example 102 | 7.5 | 2.0 | Lateral | 1 | 2 | A | A | A |

As can be seen from a comparison among Examples 62 and 83 to 85, the occurrence of fusion bonding was reduced by lowering the amount of charge in the polymer film. It is considered that the reason for this was that the slipperiness of the film was improved and therefore loosening of the wound film was more likely to occur. Further, as can be seen from a comparison among Examples 86 to 88, the occurrence of fusion bonding was inhibited even when the amount of charge was different between the front and back surfaces of the film. Further, as can be seen from a comparison among Examples 80 and 89 to 91 and a comparison among Examples 62, 92, and 93, even when the winding speed was as high as 10 m/min or 30 m/min, the occurrence of fusion bonding was inhibited by lowering the amount of charge in the polymer film.

Example 94

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the length of the polymer film was changed to 100 m, the winding tension was changed to 100 N/m, and the winding speed was changed to 10 m/min. The results are shown in Table 13.

Example 95

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the length of the polymer film was changed to 250 m, the winding tension was changed to 100 N/m, and the winding speed was changed to 10 m/min. The results are shown in Table 13.

Example 96

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the thickness of the polymer film was changed to 75 μm (trade name: APICAL 75AV), the winding tension was changed to 100 N/m, and the winding speed was changed to 10 m/min. The results are shown in Table 13.

Example 97

A carbonized film was obtained in the same manner as in Example 61 except that, as shown in FIG. 7, the polymer film was rewound while both surfaces of the polymer film were diselectrified so that the amount of charge in each of the surfaces of the wound polymer film was 1 kV and that the end of the outermost layer of the polymer film wound around the core was fixed by a 10 mm commercially-available cellophane tape and that the winding tension was changed to 100 N/m and the winding speed was changed to 10 m/min. The results are shown in Table 13.

TABLE 13

| | Raw Material Film | | | Rewinding | | | | | | Decompression in Temperature Range |
|---|---|---|---|---|---|---|---|---|---|---|
| | | | | Amount of Charge (kV) | | Winding Tension (Ps) | Nip Pressure | Winding Speed | | Lower than Pyrolysis Onset Temperature |
| | Thickness μm | Length m | Width mm | Outside | Inside | N/m | Pe/Ps | N/m | m/min | Restraint |
| Example 66 | 50 | 50 | 500 | 1 | 1 | 100 | 1 | 0 | 10 | Absent | Present |
| Example 94 | 50 | 100 | 500 | 1 | 1 | 100 | 1 | 0 | 10 | Absent | Present |
| Example 81 | 50 | 150 | 500 | 1 | 1 | 100 | 1 | 0 | 10 | Absent | Present |
| Example 82 | 50 | 150 | 500 | 1 | 1 | 100 | 1 | 0 | 30 | Absent | Present |
| Example 95 | 50 | 50 | 250 | 1 | 1 | 100 | 1 | 0 | 10 | Absent | Present |
| Example 96 | 75 | 50 | 500 | 1 | 1 | 100 | 1 | 0 | 10 | Absent | Present |
| Example 97 | 50 | 50 | 500 | 1 | 1 | 100 | 1 | 0 | 10 | Present | Present |

| | Decompression Conditions | | Conditions after Decompression | | | Container | |
|---|---|---|---|---|---|---|---|
| | Temperature | Degree of Vacuum | Temperature | Flow Rate of Nitrogen | Diameter of Core mm | Presence or Absence of External Tube | Inner Diameter of External Tube mm |
| Example 66 | R.T.-450° C. | 0.04 kPa | 450° C.-1000° C. | 5.0 L/min | 100 | Present | 130 |
| Example 94 | R.T.-450° C. | 0.04 kPa | 450° C.-1000° C. | 5.0 L/min | 100 | Present | 130 |
| Example 81 | R.T.-450° C. | 0.04 kPa | 450° C.-1000° C. | 5.0 L/min | 100 | Present | 130 |
| Example 82 | R.T.-450° C. | 0.04 kPa | 450° C.-1000° C. | 5.0 L/min | 100 | Present | 130 |

TABLE 13-continued

| | | | | | | | |
|---|---|---|---|---|---|---|---|
| Example 95 | R.T.-450° C. | 0.04 kPa | 450° C.-1000° C. | 5.0 L/min | 100 | Present | 130 |
| Example 96 | R.T.-450° C. | 0.04 kPa | 450° C.-1000° C. | 5.0 L/min | 100 | Present | 130 |
| Example 97 | R.T.-450° C. | 0.04 kPa | 450° C.-1000° C. | 5.0 L/min | 100 | Present | 130 |

| | Container | | | Rate of | Evaluations | | | |
|---|---|---|---|---|---|---|---|---|
| | | | | | Fusion Bonding | | | |
| | Thickness of Film Roll mm | a/b | Orientation | Temperature Rise to 450° C. ° C./min | Number of Layers where Fusion Bonding Occurred | | Cracking | Waving |
| Example 66 | 7.5 | 2.0 | Lateral | 1 | 0 | A | A | A |
| Example 94 | 7.5 | 2.0 | Lateral | 1 | 3 | B | A | A |
| Example 81 | 7.5 | 2.0 | Lateral | 1 | 15 | D | A | A |
| Example 82 | 7.5 | 2.0 | Lateral | 1 | 10 | D | A | A |
| Example 95 | 7.5 | 2.0 | Lateral | 1 | 0 | A | A | A |
| Example 96 | 7.5 | 2.0 | Lateral | 1 | 0 | A | A | A |
| Example 97 | 7.5 | 2.0 | Lateral | 1 | 10 | D | A | A |

As can be seen from Table 13, the use of the production method according to the present invention made it possible to obtain an excellent carbonized film even when the length, width, or thickness of the polymer film was increased. In Example 97, the end of the outermost layer of the film was fixed by a cellophane tape, and therefore loosening of the film was inhibited so that the occurrence of fusion bonding was increased. However, the cellophane tape was peeled off due to heating and therefore fusion bonding did not occur in all the layers of the film.

Example 103

A carbonized film was obtained in the same manner as in Example 1 except that the pressure in the furnace was changed to 70 kPa. The results are shown in Table 14.

Comparative Example 6

A carbonized film was obtained in the same manner as in Comparative Example 4 except that the flow rate of nitrogen gas was changed to 5 L/min. The results are shown in Table 1.4.

TABLE 14

| | Raw Material Film | | | Decompression Conditions | | Conditions after Decompression | | Presence or Absence of Restraint |
|---|---|---|---|---|---|---|---|---|
| | Thickness μm | Length m | Width mm | Temperature | Degree of Vacuum (Absolute Pressure) | Temperature | Flow Rate of Nitrogen | |
| Example 1 | 50 | 50 | 500 | R.T.-450° C. | 0.04 kPa | 450° C.-1000° C. | 5.0 L/min | Absent |
| Example 11 | 50 | 50 | 500 | R.T.-450° C. | 10 kPa | 450° C.-1000° C. | 5.0 L/min | Absent |
| Example 16 | 50 | 50 | 500 | R.T.-450° C. | 50 kPa | 450° C.-1000° C. | 5.0 L/min | Absent |
| Example 103 | 50 | 50 | 500 | R.T.-450° C. | 70 kPa | 450° C.-1000° C. | 5.0 L/min | Absent |
| Comparative Example 6 | 50 | 50 | 500 | R.T.-450° C. | 130 kPa | 450° C.-1000° C. | 5.0 L/min | Absent |

| | Container | | | | | | | Evaluations | | | |
|---|---|---|---|---|---|---|---|---|---|---|---|
| | | | Inner | | | | | Fusion Bonding | | | |
| | Diameter of Core mm | Presence or Absence of External Tube | Diameter of External Tube mm | Thickness of Film Roll mm | a/b | Orientation | Rate of Temperature Rise to 450° C. ° C./min | Heated Part | Number of Layers where Fusion Bonding Occurred | | Cracking | Waving |
| Example 1 | 100 | Present | 130 | 7.5 | 2.0 | Lateral | 1 | Outside | 0 | A | A | A |
| Example 11 | 100 | Present | 130 | 7.5 | 2.0 | Lateral | 1 | Outside | 3 | B | A | A |
| Example 16 | 100 | Present | 130 | 7.5 | 2.0 | Lateral | 1 | Outside | 8 | C | A | A |
| Example 103 | 100 | Present | 130 | 7.5 | 2.0 | Lateral | 1 | Outside | 15 | D | A | A |
| Comparative Example 6 | 100 | Present | 130 | 7.5 | 2.0 | Lateral | 1 | Outside | 20 | E | C | B |

When the degree of vacuum in a temperature range lower than the pyrolysis onset temperature was 70 kPa (Example 103), the occurrence of fusion bonding was reduced as compared to Comparative Example 6 in which decompression was not performed. This indicates that the effect of inhibiting the occurrence of fusion bonding was obtained by increasing the degree of vacuum.

DESCRIPTION OF REFERENCE NUMERALS 1 amplitude of waving
10 polymer film roll before heat treatment
20 moderately-loosened polymer film roll
21 excessively-loosened polymer film roll
30 carbonized film roll without waving
31 carbonized film roll with waving
50 polymer film
55 inner case
60 stage
65 inlet port
70 exhaust port
80 carbonized film
90 cylinder
100 core
150 gas vent
200 external tube
210 cylindrical member of external tube
220 disk-shaped member of external tube
300 pick-up roller
310 guide roller
350 nip roller
400 diselectrifying device
450 charge amount measuring point
500 heater

The invention claimed is:

1. A method for producing a carbonized film comprising:
a preparation step in which a polymer film wound around a core is prepared; and
a carbonization step in which the polymer film is placed in a heating furnace and carbonized by heat treatment to obtain a carbonized film wound around the core, wherein the carbonization step is performed by increasing a temperature of the heat treatment from an initial temperature through a pyrolysis onset temperature to a pyrolysis end temperature, and wherein the heating furnace is decompressed when the temperature of the heat treatment is lower than the pyrolysis onset temperature, and wherein the heating furnace is not decompressed after the temperature of the heat treatment reaches the pyrolysis onset temperature.

2. A method for producing a carbonized film comprising:
a preparation step in which a polymer film wound around a core is prepared; and
a carbonization step in which the polymer film is placed in a heating furnace and carbonized by heat treatment to obtain a carbonized film wound around the core, wherein the carbonization step is performed by increasing a temperature of the heat treatment from an initial temperature through a pyrolysis onset temperature to a pyrolysis end temperature, and wherein the heating furnace is decompressed when the temperature of the heat treatment is lower than the pyrolysis onset temperature, and wherein, after the temperature of the heat treatment reaches the pyrolysis onset temperature, the heating furnace is decompressed so that an absolute pressure in the heating furnace is in a range of 21.3 kPa to 101.29 kPa.

3. The method for producing a carbonized film according to claim 1 wherein an absolute pressure in the heating furnace during the decompression performed at lower than the pyrolysis onset temperature is 70 kPa or less.

4. The method for producing a carbonized film according to claim 3, wherein the absolute pressure in the heating furnace during the decompression performed at lower than the pyrolysis onset temperature is 10 kPa or less.

5. The method for producing a carbonized film according to claim 1, wherein the decompression at lower than the pyrolysis onset temperature is performed when the temperature of the heat treatment is in a range of 100 to 450° C.

6. The method for producing a carbonized film according to claim 1, wherein a rate of temperature rise during the heat treatment is 5° C./min or less until the temperature of the heat treatment reaches the pyrolysis onset temperature.

7. The method for producing a carbonized film according to claim 1, wherein an inert gas is introduced into the heating furnace after the temperature of the heat treatment reaches the pyrolysis onset temperature.

8. The method for producing a carbonized film according to claim 7, wherein the inert gas is introduced into the heating furnace at a flow rate of 1 L/min or more after the temperature of the heat treatment reaches the pyrolysis onset temperature.

9. The method for producing a carbonized film according to claim 1, wherein when subjected to the carbonization step, the polymer film wound around the core is housed in an external tube.

10. The method for producing a carbonized film according to claim 9, wherein the external tube has gas permeability.

11. The method for producing a carbonized film according to claim 10, wherein the external tube has a gas vent.

12. The method for producing a carbonized film according to claim 9, wherein when a value obtained by dividing (inner diameter of the external tube−diameter of the core) by 2 is defined as a (mm) and a thickness of a roll of the polymer film is defined as b (mm), a ratio of a/b is 1.8 or more but 3.8 or less.

13. The method for producing a carbonized film according to claim 1, wherein the preparation step is a step in which the polymer film is wound around the core while a tension of 40 N/m or more is applied to the polymer film.

14. The method for producing a carbonized film according to claim 13, wherein the polymer film is wound around the core at a winding speed of 1 m/min or more.

15. The method for producing a carbonized film according to claim 13, wherein when a tension applied to the polymer film at a point 3 m apart from an winding-start end of the film is defined as Ps and a tension applied to the polymer film at a point 3 m apart from a winding-end end of the film is defined as Pe, a tension ratio of Pe/Ps is 1.1 or more.

16. The method for producing a carbonized film according to claim 13, wherein the step in which the polymer film is wound around the core is performed while the polymer film wound around the core is pressed at a pressure of 70 N/m or less by means of a nip roller.

17. The method for producing a carbonized film according to claim 13, wherein the step in which the polymer film is wound around the core is performed without applying a pressure to the polymer film by means of a nip roller.

18. The method for producing a carbonized film according to claim 13, wherein the step in which the polymer film is wound around the core is performed while static electricity of the polymer film is eliminated.

19. A method for producing a graphite film comprising the steps of:

producing a carbonized film by the production method according to claim 1; and producing a graphite film by graphitizing the carbonized film.

20. The method for producing a carbonized film according to claim 2 wherein an absolute pressure in the heating furnace during the decompression performed at lower than the pyrolysis onset temperature is 70 kPa or less.

21. The method for producing a carbonized film according to claim 2, wherein the decompression at lower than the pyrolysis onset temperature is performed when the temperature of the heat treatment is in a range of 100 to 450° C.

22. The method for producing a carbonized film according to claim 2, wherein a rate of temperature rise during the heat treatment is 5° C./min or less until the temperature of the heat treatment reaches the pyrolysis onset temperature.

23. The method for producing a carbonized film according to claim 2, wherein an inert gas is introduced into the heating furnace after the temperature of the heat treatment reaches the pyrolysis onset temperature.

24. The method for producing a carbonized film according to claim 23, wherein the inert gas is introduced into the heating furnace at a flow rate of 1 L/min or more after the temperature of the heat treatment reaches the pyrolysis onset temperature.

25. The method for producing a carbonized film according to claim 2, wherein when subjected to the carbonization step, the polymer film wound around the core is housed in an external tube.

26. The method for producing a carbonized film according to claim 25, wherein the external tube has gas permeability.

27. The method for producing a carbonized film according to claim 26, wherein the external tube has a gas vent.

28. The method for producing a carbonized film according to claim 25, wherein when a value obtained by dividing (inner diameter of the external tube–diameter of the core) by 2 is defined as a (mm) and a thickness of a roll of the polymer film is defined as b (mm), a ratio of a/b is 1.8 or more but 3.8 or less.

29. The method for producing a carbonized film according to claim 2, wherein the preparation step is a step in which the polymer film is wound around the core while a tension of 40 N/m or more is applied to the polymer film.

30. The method for producing a carbonized film according to claim 29, wherein the polymer film is wound around the core at a winding speed of 1 m/min or more.

31. The method for producing a carbonized film according to claim 29, wherein when a tension applied to the polymer film at a point 3 m apart from an winding-start end of the film is defined as Ps and a tension applied to the polymer film at a point 3 m apart from a winding-end end of the film is defined as Pe, a tension ratio of Pe/Ps is 1.1 or more.

32. The method for producing a carbonized film according to claim 29, wherein the step in which the polymer film is wound around the core is performed while the polymer film wound around the core is pressed at a pressure of 70 N/m or less by means of a nip roller.

33. The method for producing a carbonized film according to claim 29, wherein the step in which the polymer film is wound around the core is performed without applying a pressure to the polymer film by means of a nip roller.

34. The method for producing a carbonized film according to claim 29, wherein the step in which the polymer film is wound around the core is performed while static electricity of the polymer film is eliminated.

35. A method for producing a graphite film comprising the steps of:

producing a carbonized film by the production method according to claim 2; and producing a graphite film by graphitizing the carbonized film.

* * * * *